US012455597B2

(12) United States Patent
Kim et al.

(10) Patent No.: US 12,455,597 B2
(45) Date of Patent: Oct. 28, 2025

(54) HOUSING CASE AND DISPLAY DEVICE INCLUDING THE SAME

(71) Applicant: SAMSUNG DISPLAY CO., LTD., Yongin-si (KR)

(72) Inventors: Tae Chang Kim, Yongin-si (KR); Sung Sang Ahn, Yongin-si (KR); Tae Hoon Yang, Yongin-si (KR); Byoung Su Lee, Gyeonggi-do (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 217 days.

(21) Appl. No.: 18/185,177

(22) Filed: Mar. 16, 2023

(65) Prior Publication Data

US 2024/0061470 A1 Feb. 22, 2024

(30) Foreign Application Priority Data

Aug. 16, 2022 (KR) ........................ 10-2022-0102110

(51) Int. Cl.
*G06F 1/16* (2006.01)

(52) U.S. Cl.
CPC .......... *G06F 1/1652* (2013.01); *G06F 1/1624* (2013.01); *G06F 1/1681* (2013.01)

(58) Field of Classification Search
CPC combination set(s) only.
See application file for complete search history.

(56) References Cited

U.S. PATENT DOCUMENTS

| 6,643,124 | B1 * | 11/2003 | Wilk | H04M 1/0247 |
| | | | | 345/169 |
| 6,859,219 | B1 * | 2/2005 | Sall | G06F 1/1683 |
| | | | | 345/905 |
| 8,018,715 | B2 * | 9/2011 | Chang | G06F 1/1647 |
| | | | | 361/679.04 |
| 10,082,832 | B1 * | 9/2018 | Wang | G06F 1/1681 |
| 10,817,020 | B1 * | 10/2020 | DeMaio | G06F 3/1423 |
| 11,416,024 | B2 * | 8/2022 | Bryant | G06F 1/1632 |
| 11,543,858 | B2 * | 1/2023 | Chen | G06F 1/1647 |
| 11,627,675 | B2 * | 4/2023 | Eisenberg | H05K 5/0217 |
| | | | | 361/807 |
| 11,874,704 | B2 * | 1/2024 | Ma | G06F 1/1671 |

(Continued)

FOREIGN PATENT DOCUMENTS

| KR | 10-2011-0091221 | 8/2011 |
| KR | 10-2204630 | 6/2013 |
| KR | 10-1273182 | 1/2021 |

*Primary Examiner* — Lisa Lea-Edmonds
(74) *Attorney, Agent, or Firm* — F. CHAU & ASSOCIATES, LLC

(57) ABSTRACT

A display device includes a display panel including a first active area and a second active area that is adjacent to the first active area and slides from the first active area in the first direction. An input unit is disposed adjacent to the display panel. A hinge has a folding axis in the first direction and is configured to couple the display panel with the input unit so that the display panel and the input unit is folded on the folding axis. A first motor gear is configured to provide power for a slide operation of the second active area of the display panel. The display panel includes a first slide for sliding the second active area of the display panel in the first direction. The first motor gear is disposed on one side of the hinge in the first direction to engage with the first slide.

20 Claims, 21 Drawing Sheets

(56) References Cited

U.S. PATENT DOCUMENTS

| | | | |
|---|---|---|---|
| 11,940,847 B2* | 3/2024 | Yoon | G06F 3/03545 |
| 11,953,942 B2* | 4/2024 | Sun | G06F 1/1616 |
| 2006/0082518 A1* | 4/2006 | Ram | G06F 1/1675 |
| | | | 345/1.1 |
| 2006/0268500 A1* | 11/2006 | Kuhn | G06F 1/1649 |
| | | | 361/679.04 |
| 2007/0247798 A1* | 10/2007 | Scott, II | G06F 1/1647 |
| | | | 361/679.04 |
| 2010/0124006 A1* | 5/2010 | Chang | G06F 1/1624 |
| | | | 361/679.04 |
| 2013/0128439 A1* | 5/2013 | Walters | G06F 1/1624 |
| | | | 361/679.04 |
| 2021/0080999 A1* | 3/2021 | Bryant | G06F 1/1641 |
| 2022/0147098 A1* | 5/2022 | Stewart | G06F 1/1677 |
| 2023/0236637 A1* | 7/2023 | Yoon | G09G 3/035 |
| | | | 345/168 |
| 2024/0061470 A1* | 2/2024 | Kim | G06F 1/1652 |
| 2024/0231437 A1* | 7/2024 | Yoon | G06F 1/1677 |
| 2024/0241546 A1* | 7/2024 | Hsieh | G06F 1/1654 |

* cited by examiner

HOUSING CASE AND DISPLAY DEVICE INCLUDING THE SAME

This application claims priority under 35 U.S.C. § 119 to Korean Patent Application No. 10-2022-0102110, filed on Aug. 16, 2022 in the Korean Intellectual Property Office, the disclosure of which is herein incorporated by reference in its entirety.

TECHNICAL FIELD

The disclosure relates to a display housing and, more specifically, to a housing case and a display device including the same.

DISCUSSION OF THE RELATED ART

Display devices become more and more important as multimedia technology evolves. Accordingly, a variety of types of display devices such as organic light-emitting diode (OLED) display devices and liquid-crystal display (LCD) devices are currently used.

Display devices include a display panel, such as an organic light-emitting diode display panel, and a liquid-crystal display panel for displaying images. Among them, light-emitting diode display panels may include light-emitting elements. For example, light-emitting diodes (LEDs) may include an organic light-emitting diode (OLED) using an organic material as a fluorescent material, and an inorganic light-emitting diode using an inorganic material as a fluorescent material.

Recently, research and development into flexible display devices are ongoing. The display screen of a flexible display can be folded, bent, or rolled, without sustaining crackling or other damage. Such flexible display devices have therefore been finding use in electronic devices that are capable of being reduced in size, such as by being folded when not in use.

SUMMARY

A display device includes a display panel in which a display panel is disposed. The display panel includes a first active area and a second active area that is adjacent to the first active area in a first direction and slides from the first active area in the first direction. An input unit is disposed adjacent to the display panel. A hinge has a folding axis in the first direction and is configured to couple the display panel to the input unit so that the display panel and the input unit is folded on the folding axis. A first motor gear is configured to provide power for a slide operation of the second active area of the display panel. The display panel includes a first slide for sliding the second active area of the display panel in the first direction. The first motor gear is disposed on one side of the hinge in the first direction to engage with the first slide.

The first slide may include a first lower slide. A first upper slide may be spaced apart from the first lower slide in a second direction intersecting the first direction. A roller may be disposed between the first lower slide and the first upper slide. The second active area of the display panel may be bent to surround at least a part of the roller.

The first lower slide may include a rack gear extended in the first direction. The first motor gear may be engaged with the rack gear to move the rack gear in the first direction.

The display device may further include a gearing configured to connect the first motor gear with the rack gear. The first motor gear may have a bevel gear shape. The gearing may include a first gear engaged with the first motor gear as a bevel gear. A pinion gear may be disposed on an opposite side to the first gear and may be engaged with the rack gear.

The second active area of the display panel may include a first end adjacent to the first active area. A second end may be disposed opposite to the first end. A panel connector may be disposed on the second end of the second active area. The first lower slide may further include a guide disposed adjacent to the rack gear. At least a part of the panel connector may be engaged with the guide.

the first upper slide, the first lower slide, and the roller may all move together.

The rack gear and the guide of the first lower slide may both move together.

When the first lower slide is moved by a first unit in the first direction by the first motor gear, the panel connector may move further by the first unit on the guide of the first lower slide.

The display panel may include a third active area disposed opposite to the second active area with the first active area therebetween. A first subsidiary area may protrude from the first active are in the second direction. The display panel may further include a first protrusion that protrudes from the display panel in a second direction intersecting the first direction and is coupled with an end of the hinge. A second protrusion may protrude from the display panel in the second direction and may be coupled with an opposite end of the hinge. A second slide may slide the third active area in the first direction. The first motor gear may be accommodated in the first protrusion of the display panel and may be engaged with the first slide. The display device may further include a second motor gear accommodated in the second protrusion and engaged with the second slide to provide power for a slide operation of the third active area.

The hinge may be disposed between the first protrusion and the second protrusion.

The first protrusion and the second protrusion are each configured to rotate on the folding axis.

The first subsidiary area may be disposed in the display panel such that it is bent.

The first subsidiary area may be extended to the input unit through the hinge.

The display device may further include a second subsidiary area opposite to the first subsidiary area with the second active area disposed therebetween.

A housing case includes a first housing in which a display panel is accommodated. A second housing is disposed on one side of the first housing. A hinge having a folding axis in the first direction is disposed between the first housing and the second housing to couple them with each other. The first housing includes a first panel housing adjacent to the second housing with the hinge disposed therebetween. A second panel housing slides in the first direction from the first panel housing. A slide is disposed between the first panel housing and the second panel housing to slide the second panel housing. A motor gear is disposed on one side of the hinge in the first direction and is engaged with the slide to provide power for a slide operation of the second panel housing.

The first housing may further include a protrusion that protrudes from the first panel housing in a second direction intersecting the first direction. The first housing may be coupled with one end of the hinge, and may accommodate the motor gear. The slide may include a lower slide disposed adjacent to the protrusion. An upper slide is spaced apart from the lower slide in the second direction. A roller may be disposed between the lower slide and the upper slide. The display panel may be bent around the roller.

The lower slide may include a rack gear extended in the first direction. The motor gear may be engaged with the rack gear to move the rack gear in the first direction.

The housing case may further include a gearing configured to connect the first motor gear with the rack gear. The motor gear may have a bevel gear shape. The gearing may include a gear engaged with the motor gear as a bevel gear. A pinion gear may be disposed on an opposite side to the first gear and engaged with the rack gear.

A rotation axis of the motor gear may extend in the first direction. A rotation axis of the first gear may extend in the second direction.

The motor gear may have a bevel gear shape that becomes narrower toward one side in the first direction. The first gear of the gearing may have a bevel gear shape that becomes narrower toward one side in the second direction.

A housing case includes a first housing that slides in a first direction. A second housing is disposed on one side of the first housing. A hinge has a folding shaft in the first direction and is disposed between the first housing and the second housing to couple them with each other. A drive motor is disposed on one side of the hinge in the first direction to provide power for a sliding operation of the first housing.

The display device may be folded and may slide.

The housing case may be folded and may slide.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

The present invention will now be described more fully hereinafter with reference to the accompanying drawings, in which embodiments of the invention are shown. This invention may, however, be embodied in different forms and should not necessarily be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers may indicate the same components throughout the specification and the drawings.

It will be understood that, although the terms "first," "second," etc. may be used herein to describe various elements, these elements should not necessarily be limited by these terms. These terms are only used to distinguish one element from another element. For instance, a first element discussed below could be termed a second element without departing from the teachings of the present invention. Similarly, the second element could also be termed the first element.

Features of each of various embodiments of the disclosure may be partially or entirely combined with each other and may technically variously interwork with each other, and respective embodiments may be implemented independently of each other or may be implemented together in association with each other.

Hereinafter, embodiments of the disclosure will be described with reference to the accompanying drawings.

Figure 1:
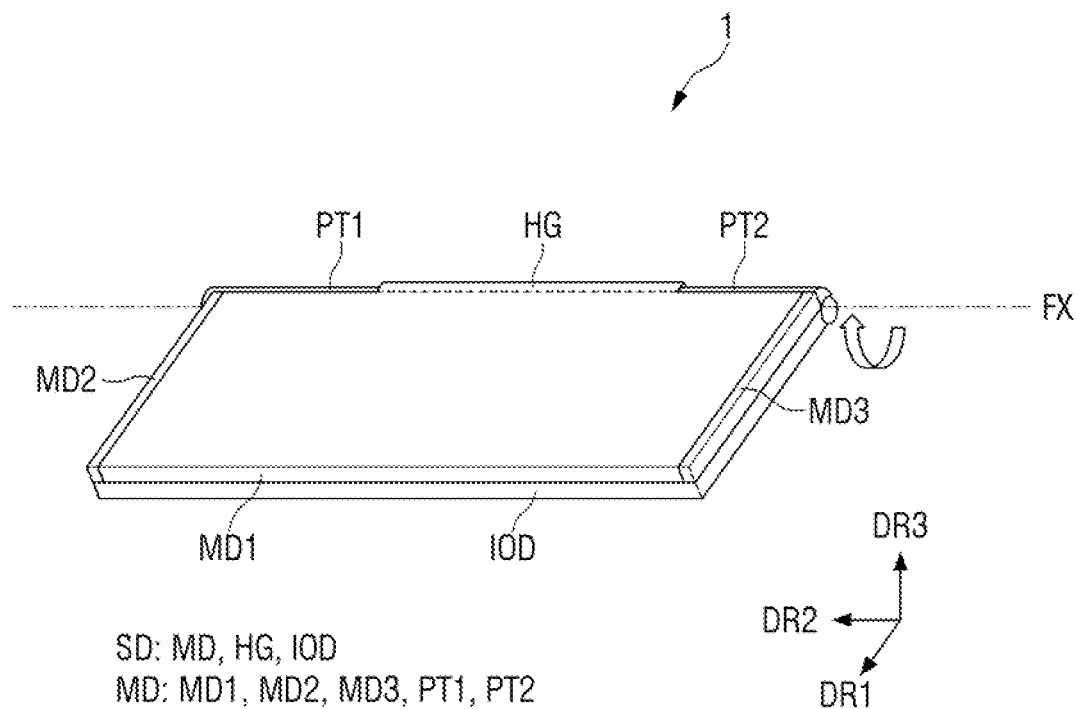
FIG. 1 is a perspective view of a display device in a folded state according to an embodiment of the disclosure.
Figure 2:
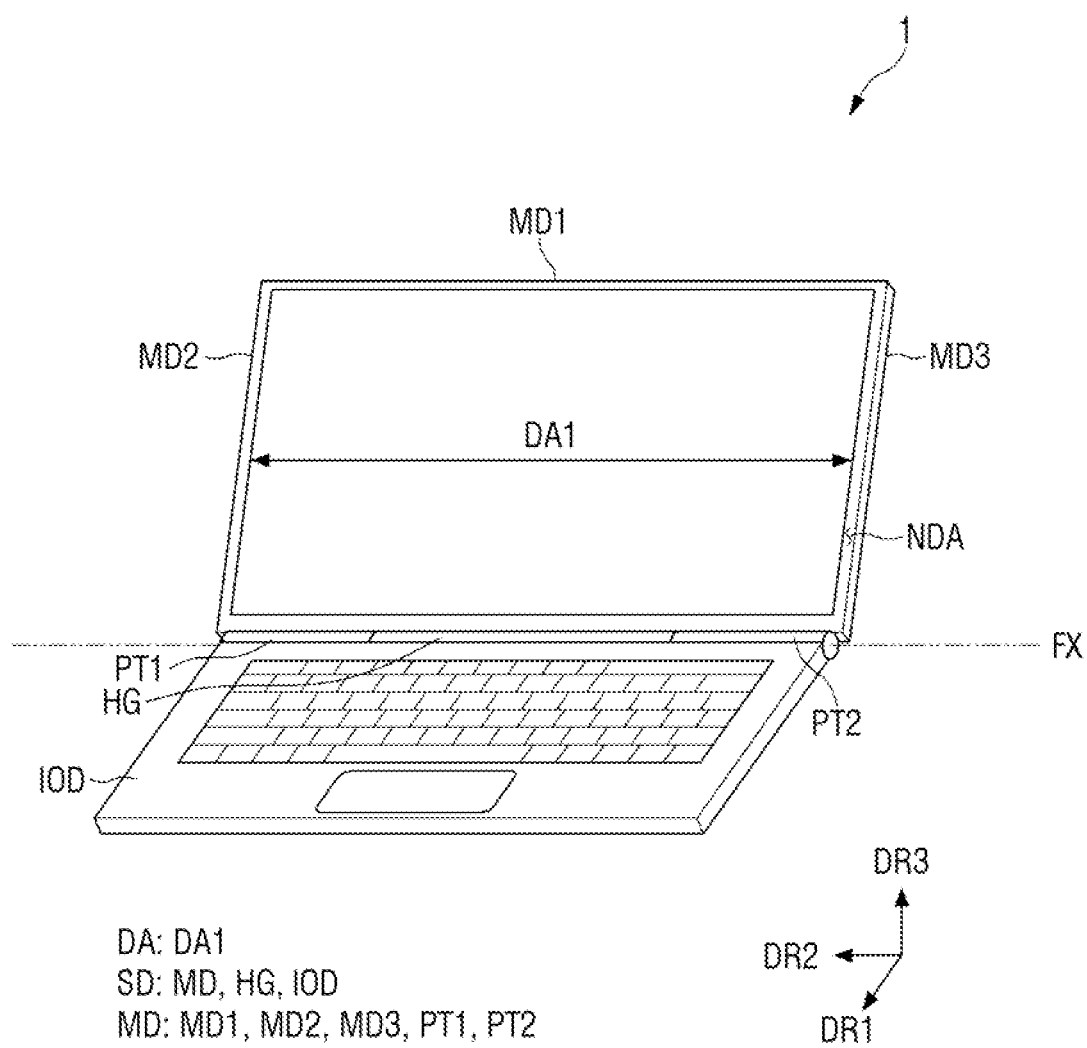
FIG. 2 is a perspective view showing a display device according to an embodiment of the disclosure.
Figure 3:
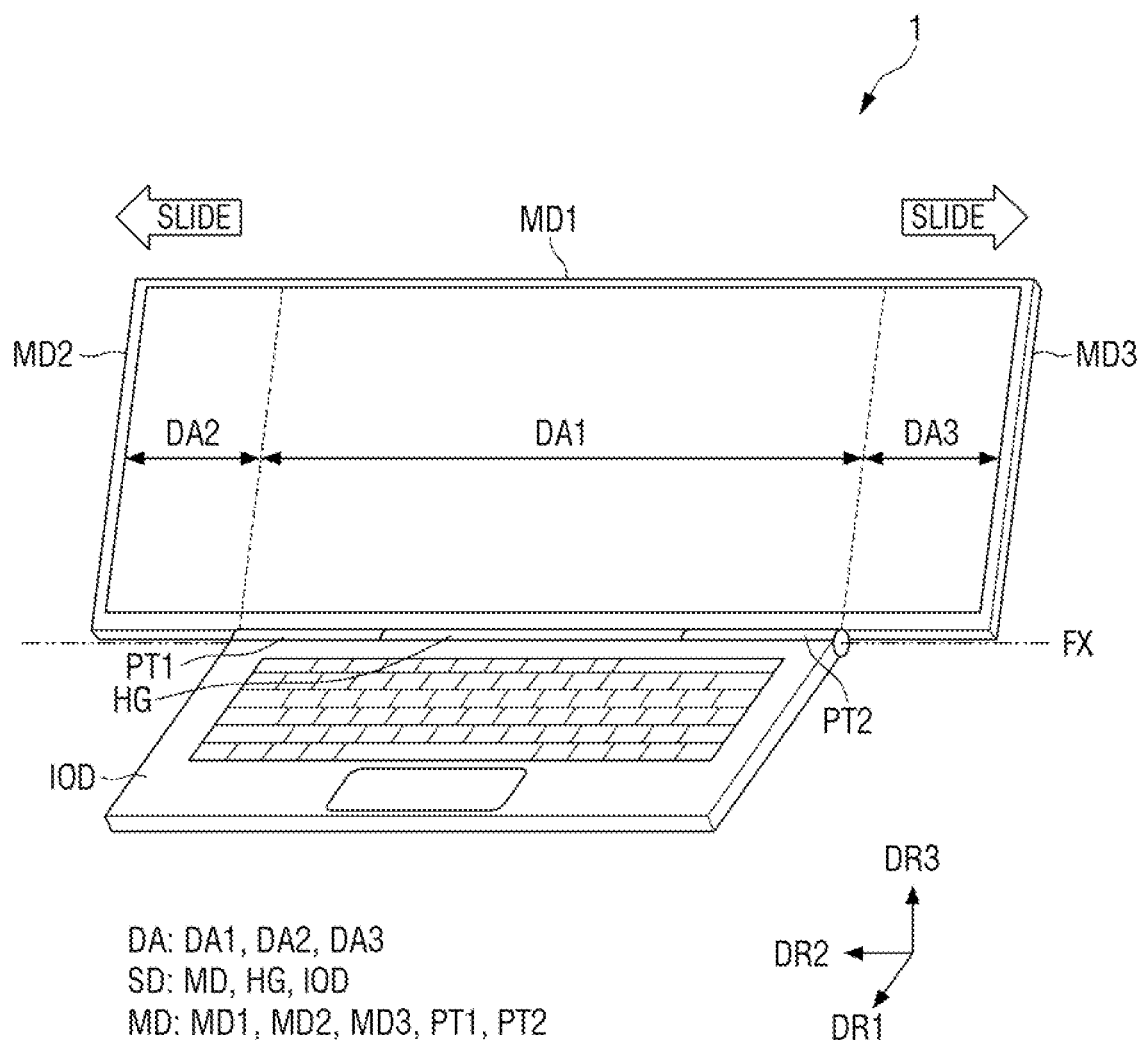
FIG. 3 is a perspective view showing a display device expanded on two sides according to an embodiment of the disclosure.
Figure 4:
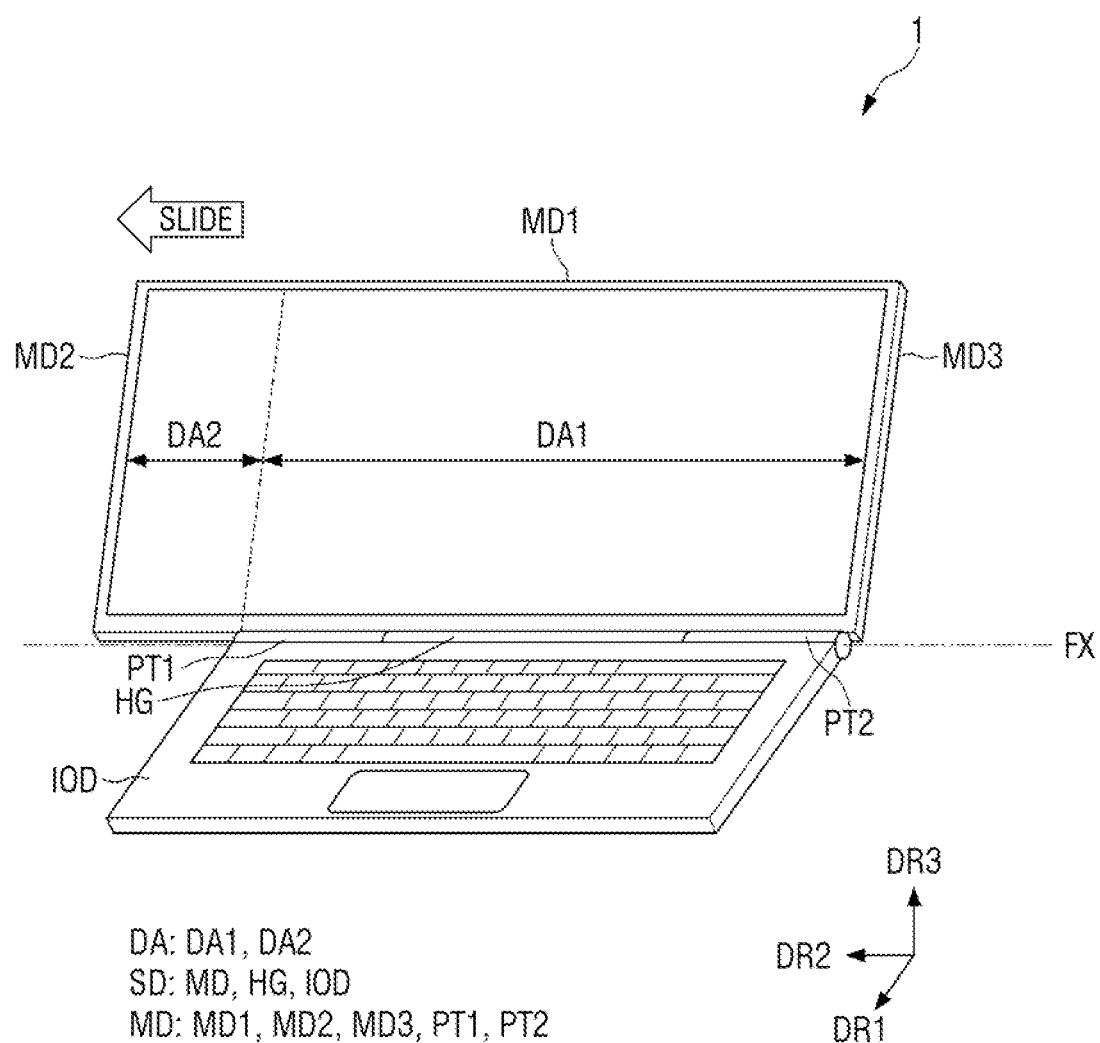
FIG. 4 is a perspective view of a display device when it is expanded on one side according to an embodiment of the disclosure.

FIG. 1 is a perspective view of a display device in a folded state according to an embodiment of the disclosure. FIG. 2 is a perspective view showing a display device according to an embodiment of the disclosure. FIG. 3 is a perspective view showing the display device when it is expanded on two sides. FIG. 4 is a perspective view of the display device when it is expanded on one side.

In FIG. 1, a first direction DR1, a second direction DR2 and a third direction DR3 are defined. The first direction DR1 and the second direction DR2 are perpendicular to each other, the first direction DR1 and the third direction DR3 are perpendicular to each other, and the second direction DR2 and the third direction DR3 may be perpendicular to each other. The first direction DR1 may refer to the horizontal direction in the drawings, the second direction DR2 may refer to the vertical direction in the drawings, and the third direction DR3 may refer to the up-and-down direction in the drawings. As used herein, a direction may refer to the direction indicated by the arrow as well as the opposite direction, unless specifically stated otherwise. If it is necessary to discern between such two opposite directions, one of the two directions may be referred to as "one side in the direction," while the other direction may be referred to as "the opposite side in the direction." In FIG. 1, the side indicated by the arrow of a direction is referred to as one side in the direction, while the opposite side is referred to as the opposite side in the direction.

As used herein, when an element is referred to as being "connected" or "coupled" to another element, it can be directly connected or coupled to the element or intervening elements may be present. In addition, such elements may be understood as a single integrated element with one portion thereof connected to another portion.

Referring to FIGS. 1 to 4, a display device 1, according to an embodiment, displays moving images or still images. The display device 1 may be used as the display screen of portable electronic devices such as a mobile phone, a smart phone, a tablet PC, a smart watch, a watch phone, a mobile communications terminal, an electronic notebook, an electronic book, a portable multimedia player (PMP), a navigation device and an ultra mobile PC (UMPC), as well as the display screen of various products such as a television, a laptop computer, a monitor, a billboard and an Internet of Things device. In the following description, the display device 1, according to the embodiment, is used for a laptop computer.

The display device 1, according to the embodiment, may include a housing case SD that covers the exterior of the display device 1. The housing case SD may include a display unit MD in which a display panel PNL (see FIG. 5) where images are displayed on a screen is accommodated; an input unit IOD in which an input means such as a keyboard is accommodated; and a hinge HG disposed between the display unit MD and the input unit IOD so that the display unit MD and the input unit IOD are coupled by the hinge HG.

The display unit MD may include a first protrusion PT1, a second protrusion PT2, a first panel housing MD1, a second panel housing MD2, and a third panel housing MD3. A display area DA in which images are displayed and a non-display area NDA in which no image displayed may be defined therein.

As shown in FIGS. 1 and 2, the display device 1, according to the embodiment, may be a foldable display device, i.e., a part of the display device can be folded (or bent) along a folding axis FX parallel to the second direction DR2. For example, the display device 1, according to the embodiment, may be folded along the folding axis FX by the hinge HG so that the display unit MD and the input unit IOD face each other.

The first protrusion PT1 and the second protrusion PT2 of the display unit MD may rotate the display unit MD so that the display device 1 is folded. The first protrusion PT1 and the second protrusion PT2 may protrude from the first panel housing MD1 of the display unit toward the opposite side in the third direction DR3 to be coupled to both ends of the hinge HG, respectively.

For example, the first protrusion PT1 may protrude from one side of the first panel housing MD1 in the second direction DR2 toward the opposite side in the third direction DR3 so as to be coupled with one end of the hinge HG in the second direction DR2. The second protrusion PT2 may protrude from the opposite side of the first panel housing MD1 in the second direction DR2 toward the opposite side in the third direction DR3 so as to be coupled with the other end of the hinge HG in the second direction DR2.

The first protrusion PT1 and the second protrusion PT2 may rotate about the folding axis FX of the hinge HG. Accordingly, the display unit MD may also rotate about the folding axis FX of the hinge HG. For example, when viewed from one side in the second direction DR2 parallel to the folding axis FX, the display device 1 is folded if the display unit MD rotates clockwise about the folding axis FX as shown in FIG. 1, and the display device 1 is unfolded if the display unit MD rotates counterclockwise about the folding axis FX as shown in FIG. 2.

When the display unit MD of the display device 1 rotates on the folding axis FX so that the display device 1 is folded, the display unit MD and the input unit IOD may be adjacent to each other in the third direction DR3 as shown in FIG. 1. When the display unit MD rotates on the folding axis FX so that the display device 1 is unfolded, the display unit MD and the input unit IOD may be away from each other as shown in FIG. 2. With the above-described configuration, the volume of the display device 1 can be adjusted, so that the portability of the display device 1 can be improved.

In addition, the display device 1, according to the embodiment, may be a sliding display device or a slideable display device in which the display unit MD is slidable in the second direction DR2, i.e., in a direction parallel to the folding axis FX, as shown in FIGS. 3 and 4. The display device 1, according to the embodiment, may be, but is not necessarily limited to, a multi-slidable display device that slides in the two directions as shown in FIG. 3. For example, the display device 1 may be a single slideable display device that slides only in one direction as shown in FIG. 4. In the following description, a multi-slidable display device will be described as the display device 1 according to the embodiment.

The first panel housing MD1 of the display unit MD may be located at the center of the display unit MD, the second panel housing MD2 may be located on one side of the first panel housing MD1 in the second direction DR2 to slide toward one side in the second direction DR2, and the third panel housing MD3 may be located on the opposite side of the first panel housing MD1 in the second direction DR2 to slide toward the opposite side in the second direction DR2. The sliding operations of the second panel housing MD2 and the third panel housing MD3 will be described in detail later.

The first panel housing MD1, the second panel housing MD2 and the third panel housing MD3 may accommodate the display panel PNL (see FIGS. 5 and 10) to be described later, and may expose at least a part of the display panel PNL to define the display area DA. For example, the display area DA may be defined as one surface of the display panel PNL in the first direction DR1 that is exposed by the first panel housing MD1, the second panel housing MD2 and the third panel housing MD3. For example, referring to FIG. 5, the display panel PNL may include a plurality of pixels on the one side surface in the first direction DR1, and the first panel housing MD1, the second panel housing MD2 and the third panel housing MD3 may expose the one side surface of the display panel PNL in the first direction DR1 to display images.

The other part of the one surface of the display panel PNL in the first direction DR1 may be defined as the non-display area NDA that is not exposed by the panel housing MD1, the second panel housing MD2 and the third panel housing MD3. In some embodiments, the non-display area NDA may be disposed around the display area DA to surround the display area DA, but the disclosure is not necessarily limited thereto. In the example shown in FIGS. 2 to 4, the non-display area NDA is disposed around the display area DA to surround the display area DA.

The display unit MD may include a flat area and bent areas. The flat area of the display unit MD substantially overlaps with the area where the display unit MD exposes the display panel PNL, i.e., the display area DA. The bent areas may be curved with a predetermined radius of curvature, and the display panel PNL may be curved according to the radius of curvature. The bent areas may be disposed on both sides of the flat area in the second direction DR2. For example, a first bent area may be located on one side of the flat area in the second direction DR2, and a second bent area may be located on the opposite side in the second direction DR2. The flat area of the display unit MD may become larger as the display unit MD is expanded in the second direction DR2 as shown in FIGS. 2 to 4. As a result, the distance between the first bent area and the second bent area may increase.

The first panel housing MD1 of the display unit MD may form the flat area of the display device 1 and may accommodate a first active area AA1 (see FIG. 10) of the display panel PNL, which will be described later. The second panel housing MD2 of the display unit MD may form the first bent area, in which a second active area AA2 (see FIG. 10) of the display panel PNL to be described later is bent and accommodated. The third panel housing MD3 of the display unit MD may form the second bent area, in which a third active area AA3 (see FIG. 10) of the display panel PNL to be described later is bent and accommodated.

The display area DA of the display unit MD may be divided into a first display area DA1, a second display area DA2 and a third display area DA3 depending on whether the display panel PNL slides or not and on how long it slides if it does. For example, when the display panel PNL does not slide, it has the first display area DA1 of a first area. When the display panel PNL slides, the display area DA further includes the expanded second display area DA2 and third display area DA3 in addition to the first display area DA1.

In the first display area DA1 where the first panel housing MD1 exposes the first active area AA1 of the display panel PNL, the flat area of the display unit MD and the first active area AA1 of the display panel PNL overlap each other. In the second display area DA2 where the second panel housing MD2 exposes the second active area AA2 of the display panel PNL, the flat area of the display unit MD and the second active area AA2 of the display panel PNL overlap each other. In the third display area DA3 where the third panel housing MD3 exposes the third active area AA3 of the display panel PNL, the flat area of the display unit MD and the third active area AA3 of the display panel PNL overlap each other.

The areas of the second display area DA2 and the third display area DA3 may vary depending on how long the display unit MD slides. When the display unit MD slides to the maximum, the second display area DA2 has a second area, the third display area DA3 has a third area, and the display area DA has a fourth area which is the sum of the first area, the second area and the third area. The fourth area may be the maximum area that the display area DA can have.

Hereinafter, the structure of the display panel PNL will be described.

Figure 5:
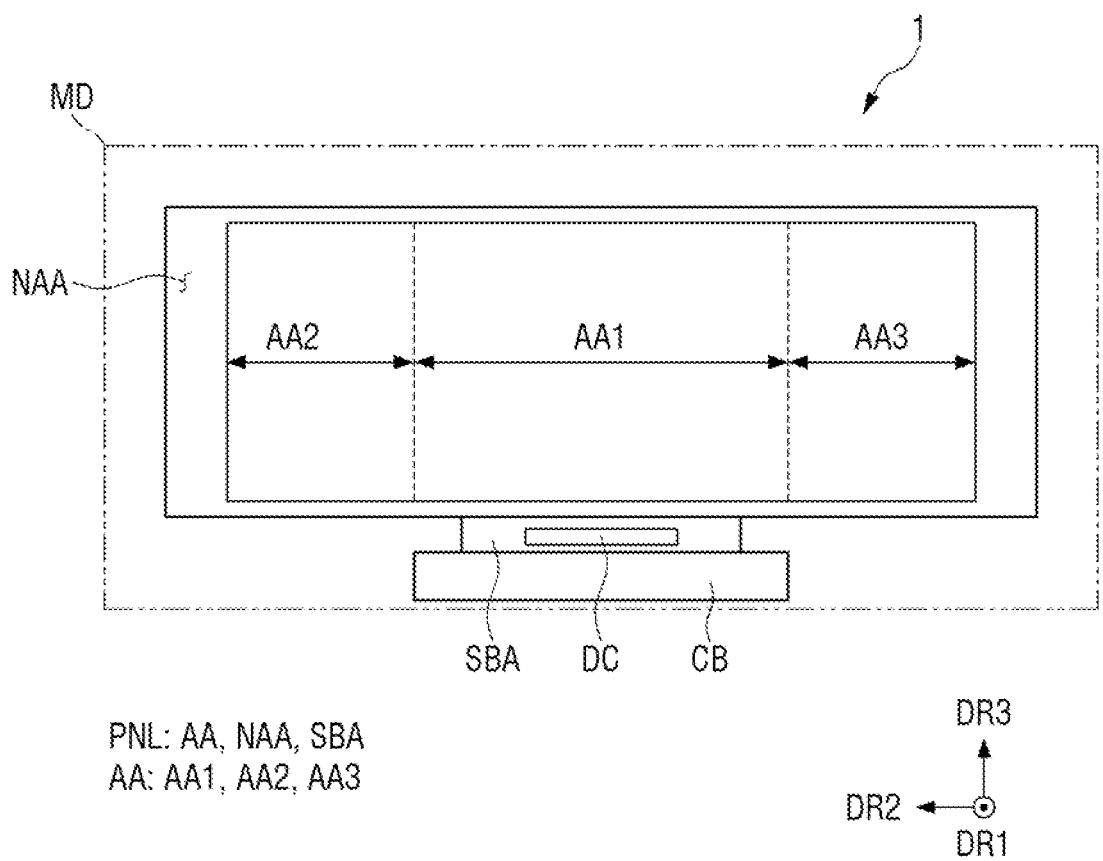
FIG. 5 is a plan view showing a display panel according to an embodiment of the disclosure.
Figure 6:
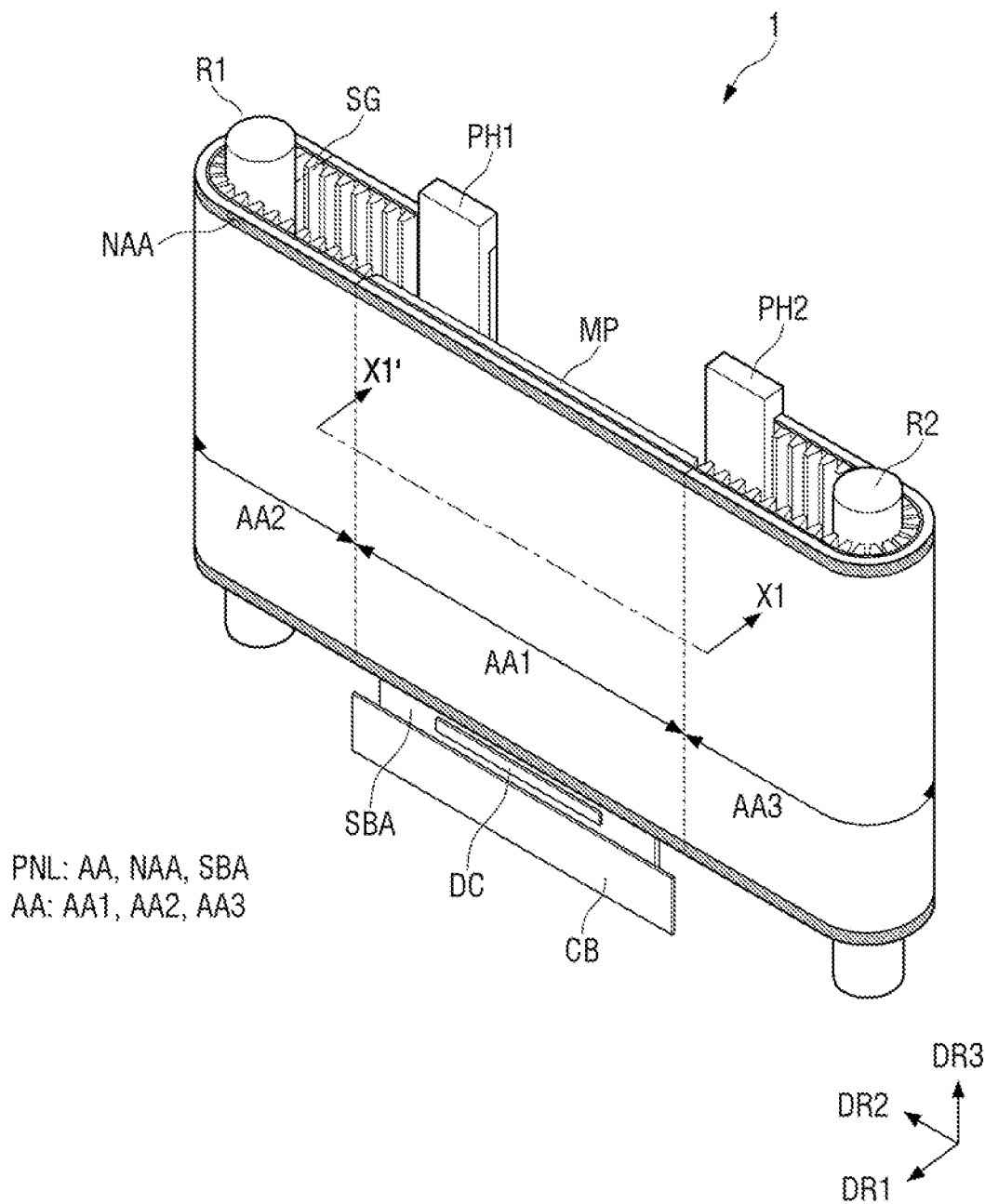
FIG. 6 is a perspective view showing a display panel according to an embodiment of the disclosure.
Figure 7:
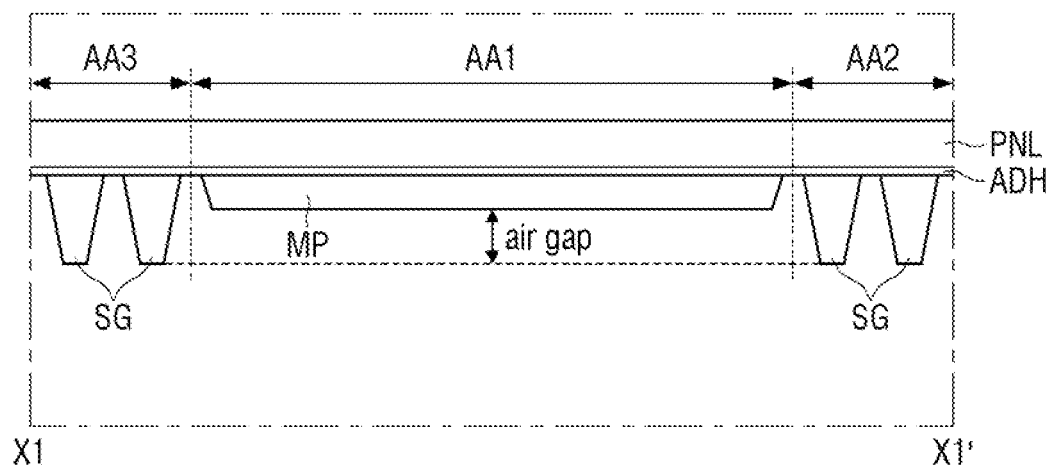
FIG. 7 is a cross-sectional view taken along line X1-X1' of FIG. 6.
Figure 7:
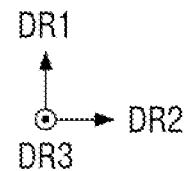

FIG. 5 is a plan view showing a display panel according to an embodiment of the disclosure. FIG. 6 is a perspective view showing a display panel according to an embodiment of the disclosure. FIG. 7 is a cross-sectional view taken along line X1-X1' of FIG. 6.

Referring to FIGS. 5 to 7, the display panel PNL accommodated in the display unit MD displays images thereon. Any kind of display panel may be employed as the display panel PNL according to the embodiment, such as an organic light-emitting display panel including an organic light-emitting layer, a micro light-emitting diode display panel using micro LEDs, a quantum-dot light-emitting display panel using quantum-dot light-emitting diodes including quantum-dot light-emitting layer, and an inorganic light-emitting display panel using inorganic light-emitting elements including an inorganic semiconductor.

The display panel PNL may be a flexible panel. The display panel PNL may have flexibility so that it can be at least partially rolled, bent or curved in the display unit MD of the housing case SD to a noticeable degree without cracking or otherwise sustaining damage. The display panel PNL may slide in the second direction DR2 as shown in FIG. 5.

The display panel PNL may include an active area AA and a non-active area NAA.

In the active area AA of the display panel PNL, pixels may be disposed. The active area AA may include a first active are AA1 supported by a main plate MP (see FIGS. 6 and 7), which will be described later, a second active area AA2 supported by a plurality of segments SG, and a third active area AA3 supported by a plurality of segments SG. The first active area AA1 of the display panel PNL may be always flat that maintains a flat shape regardless of the sliding motion.

Each of the second active area AA2 and the third active area AA3 of the display panel PNL may be either a bent area that is rolled, bent or curved, or a bendable area changing between a rolled, bent or curved shape and a flat shape according to the sliding operation. Accordingly, the second active area AA2 of the display panel PNL is bent by a first roller R1, and the third active area AA3 may be bent by a second roller R2. In some embodiments, the first roller R1 and the second roller R2 may be omitted.

Referring to FIGS. 5 to 7 in conjunction with FIGS. 2 to 4, the first display area DA1 may substantially overlap with the first active area AA1 of the display panel PNL, the second display area DA2 may overlap with at least a part of the second active area AA2 of the display panel PNL, and the third display area DA3 may overlap with at least a part of the third active area AA3 of the display panel PNL. In some embodiments, the boundary between the first display area DA1 and the second display area DA2 may coincide with the boundary between the first active area AA1 and the second active area AA2, and the boundary between the first display area DA1 and the second display area DA2 may coincide with the boundary between the first active area AA1 and the third active area AA3. It should be understood, however, but the disclosure is not necessarily limited thereto.

There might be no pixels disposed within the non-active area NAA of the display panel PNL. In the non-active area NAA, metal lines such as a data/scan lines, and touch lines may be disposed. The non-active area NAA may include a bezel area and a dummy area. The non-active area NAA may surround the active area AA.

The bezel area may be formed at both ends of the active area AA in the third direction DR3 as shown in FIGS. 5 and 6. For example, the bezel area may include a first bezel area formed at one end of the active area AA in the third direction DR3, and a second bezel area formed at the opposite end of the active area AA in the third direction DR3.

The dummy area may be formed at both ends of the active area AA in the second direction DR2 as shown in FIGS. 5 and 6. For example, referring to FIG. 5, a portion of the dummy area located at one end of the second active area AA2 in the second direction DR2 may be referred to as a first dummy area, and a portion of the dummy area located at the opposite end of the third active area AA3 in the second direction DR2 may be referred to as a second dummy area.

The display panel PNL may further include a subsidiary area SBA. The subsidiary area SBA may be disposed on the opposite side of the first active area AA1 of the display panel PNL in the third direction DR3. The subsidiary area SBA may have, but is not necessarily limited to having, a rectangular shape when viewed from the top.

A driver circuit DC and a circuit board CB may be disposed on a surface of the subsidiary area SBA in the first direction DR1. The circuit board CB may be attached on the subsidiary area SBA using an anisotropic conductive film (ACF). The circuit board CB may be electrically connected to a pad area formed on the subsidiary area SBA. The circuit board CB may be a flexible printed circuit board (FPCB), a printed circuit board (PCB), or a flexible film such as a chip-on-film (COF). The driver circuit DC may be implemented as an integrated circuit (IC) and may be attached to the subsidiary area SBA by a chip-on-glass (COG) technique, a chip-on-plastic (COP) technique, or ultrasonic bonding. Alternatively, the driver circuit DC may be mounted on the circuit board CB. In some embodiments, the circuit board CB may have, but is not necessarily limited to having, a rectangular shape having the longer sides in the second direction DR2 and the shorter sides in the third direction DR3.

In some embodiments, the length of the subsidiary area SBA in the second direction DR2 may be smaller than the length of the circuit board CB in the second direction DR2. It should be understood, however, that the disclosure is not necessarily limited thereto. In some embodiments, the length of the circuit board CB in the second direction DR2 disposed on a surface of the subsidiary area SBA in the first direction DR1 may be substantially equal to the length of the first active area AA1 in the second direction DR2. It should be understood, however, that the disclosure is not necessarily limited thereto. In the example shown in FIGS. 5 and 6, the length of the circuit board CB in the second direction DR2 is greater than the length of the subsidiary area SBA in the second direction DR2, and is substantially equal to the length of the first active area AA1 in the second direction DR2.

On the bottom of the display panel PNL, i.e., on the opposite side of the display panel PNL in the first direction DR1 (hereinafter referred to as a "bottom surface" of the display panel PNL with reference to FIG. 5, a main plate MP, a plurality of segments SG, a first panel connector PH1 and a second panel connector PH2 may support the bottom surface of the display panel PNL. The main plate MP, the plurality of segments SG, the first panel connector PH1 and the second panel connector PH2 are attached to the bottom surface of the display panel PNL to support the display panel PNL.

Referring to FIG. 7, an adhesive ADH may be interposed between the bottom surface of the display panel PNL, and the main plate MP and the plurality of segments SG. In some embodiments, the adhesive ADH may be, but is not necessarily limited to, a pressure sensitive adhesive (PSA). Although not shown in the drawings, an adhesive ADH may be interposed between the bottom surface of the display panel PNL and the first panel connector PH1 and between the bottom surface of the display panel PNL and the second panel connector PH2.

The main plate MP, the plurality of segments SG, the first panel connector PH1 and the second panel connector PH2 may have substantially the same relative positional relationship with respect to the display panel PNL. For example, when the display panel PNL is flat without bending, at least one plane parallel to the display panel PNL may pass through the main plate MP, the plurality of segments SG, the first panel connector PH1 and the second panel connector PH2.

The main plate MP may support the first active area AA1 of the display panel PNL. The main plate MP may be disposed between the plurality of segments SG supporting the second active area AA2 and the plurality of segments SG supporting the third active area AA3. The main plate MP and the first active area AA1 of the display panel PNL may overlap each other in the third direction DR3.

The main plate MP may have a plane shape extended in the second direction DR2 and the third direction DR3. For example, the main plate MP may have a generally flat shape when viewed from the top. The main plate MPL may have the same thickness, i.e., the width in the first direction DR1 along the profile of the first active area AA1 of the display panel PNL.

The first active area AA1 of the display panel PNL may be attached to the upper surface of the main plate MP, i.e., one surface in the first direction DR1. An air gap to be described later may be formed on the bottom surface of the main plate MP, i.e., the opposite surface in the first direction DR1.

The plurality of segments SG may support the second active area AA2 and the third active area AA3 of the display panel PNL. Each of the plurality of segments SG may be extended in the third direction DR3 and may be spaced apart from one another in the second direction DR2 as shown in FIGS. 6 and 7. The thickness of each of the plurality of segments SG, i.e., the width in the first direction DR1 may be larger than the thickness of the main plate MP. Accordingly, an air gap may be formed under the main plate MP as shown in FIG. 7. As the air gap is formed under the main plate MP, a shock applied to the display panel PNL can be mitigated. For example, the air gap may absorb a shock when an object such as a user's pen drops onto the first active area AA1 of the display panel PNL.

Although the main plate MP is disposed only in the first active area AA1 and is spaced apart from the plurality of segments SG in the example shown in FIGS. 6 and 7, the shapes of the main plate MP and the plurality of segments SG are not necessarily limited thereto. For example, the main plate MP may be disposed in the second active area AA2 and the third active area AA3 beyond the first active area AA1, and the segments SG may be attached to the parts of the main plate MP that overlap with the second active area AA2 and the third active area AA3.

The first panel connector PH1 and the second panel connector PH2 may support the above-described dummy area of the display panel PNL. For example, the first panel connector PH1 may support the bottom surface of the first dummy area disposed at one end of the second active area AA2 in the second direction DR2 with reference to FIG. 5, and the second panel connector PH2 may support the bottom surface of the second dummy area disposed at the opposite end of the third active area AA3 in the second direction DR2 with reference to FIG. 5.

The width of the first panel connector PH1 in the third direction DR3 may be greater than the width of the first dummy area of the display panel PNL in the third direction DR3, and the width of the second panel connector PH2 in the third direction DR3 may be greater than the width of the second dummy area of the display panel PNL in the third direction DR3. Accordingly, at least a part of the first panel connector PH1 and at least a part of the second panel connector PH2 may protrude from the display panel PNL in the third direction DR3. The protruding part of the first panel connector PH1 and the protruding part of the second panel connector PH2, which protrude from the display panel PNL in the third direction DR3 may be coupled with guides GD (see FIG. 11) of slides SM (see FIG. 11) to fix the two ends of the display panel PNL, allowing for the sliding operation of the display panel PNL, which will be described later. This will be described in more detail later.

Hereinafter, a structure in which the display panel PNL and various elements are accommodated in the display unit MD will be described.

Figure 8:
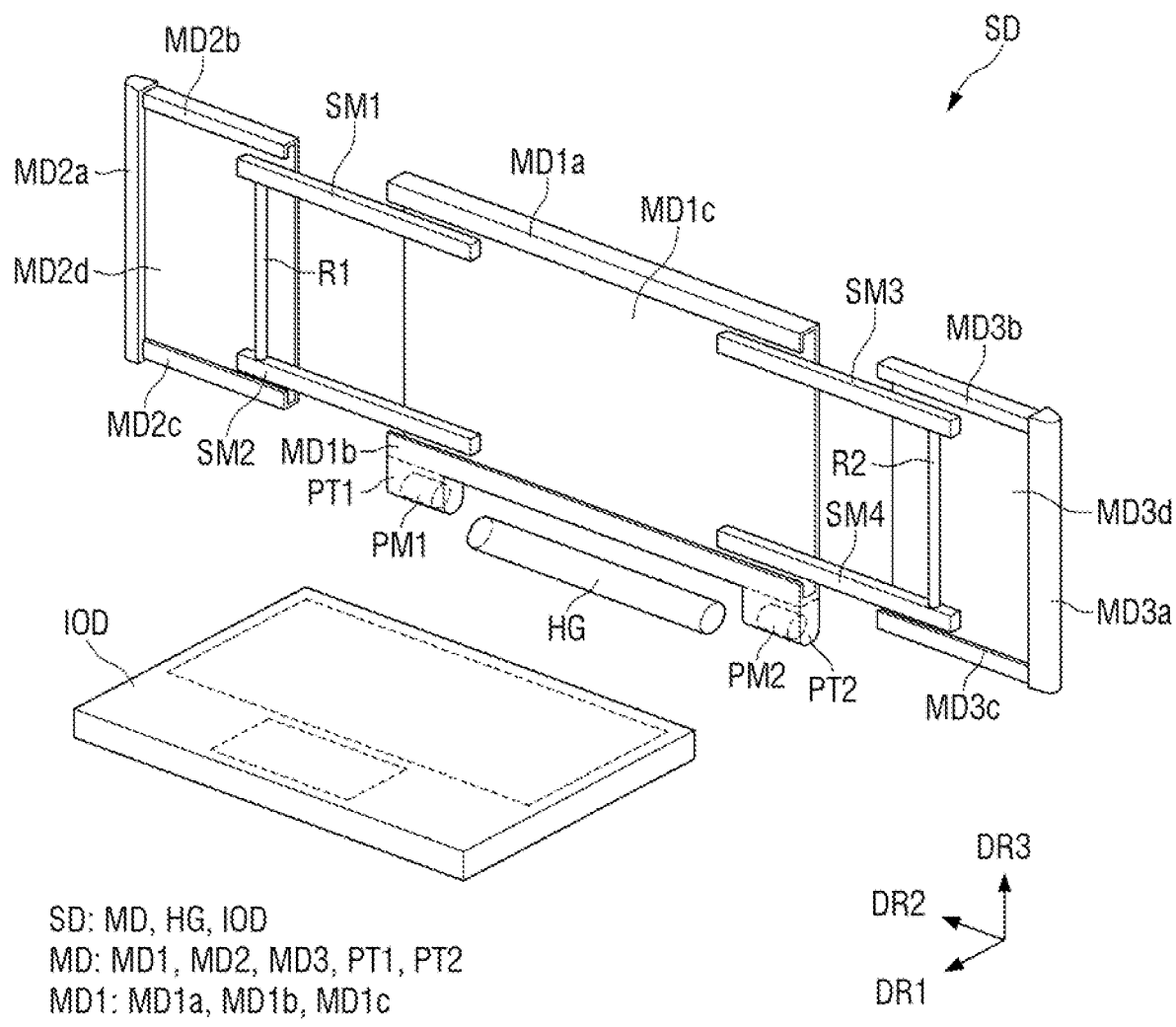
FIG. 8 is an exploded, perspective view of a housing case of a display device according to an embodiment of the disclosure.
Figure 9:
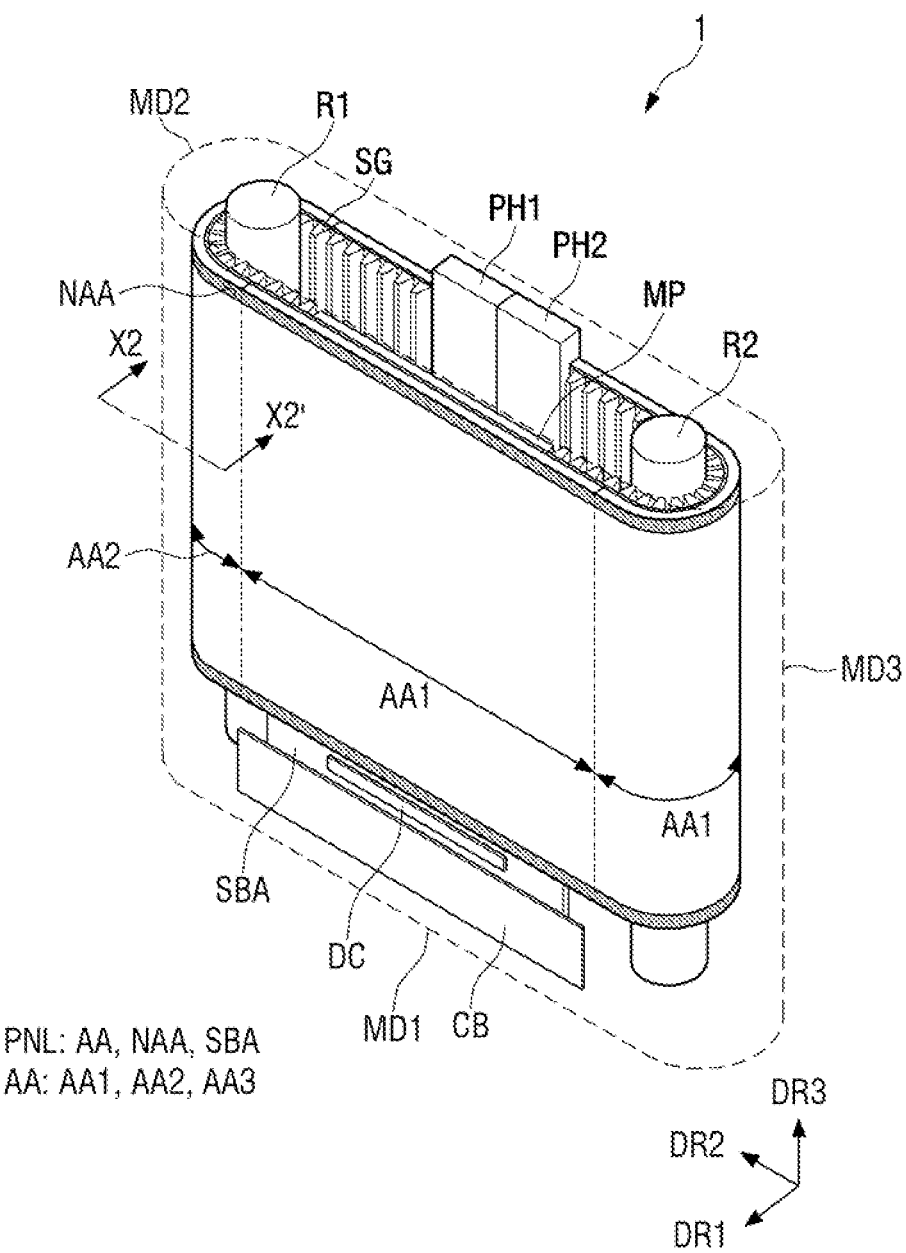
FIG. 9 is a perspective view showing a display panel accommodated in a display panel according to an embodiment of the disclosure.
Figure 10:
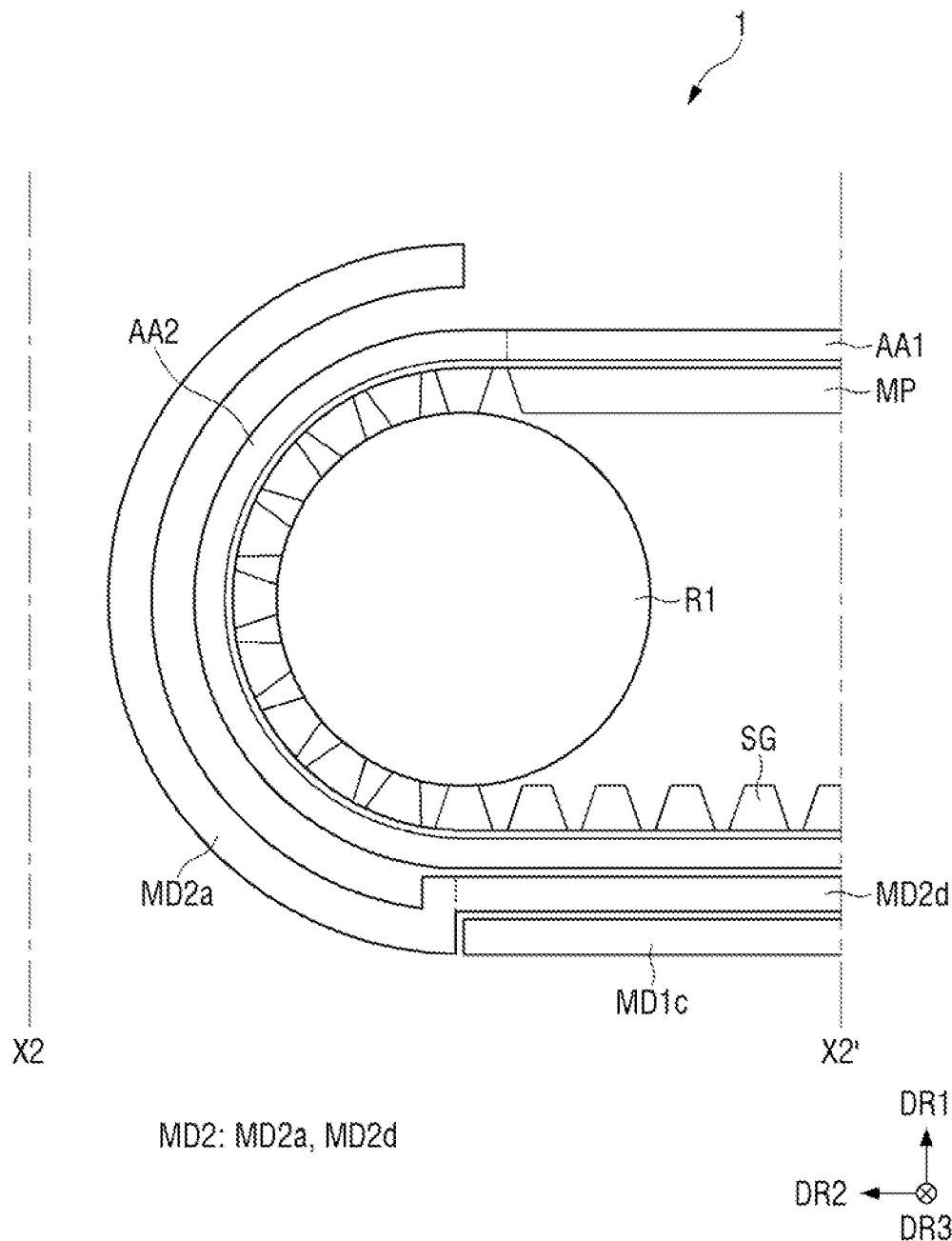
FIG. 10 is a cross-sectional view taken along line X2-X2' of FIG. 9.

FIG. 8 is an exploded, perspective view of a housing case of a display device according to an embodiment. FIG. 9 is a perspective view showing a display panel accommodated in a display unit MD according to the embodiment. FIG. 10 is a cross-sectional view taken along line X2-X2' of FIG. 9.

FIG. 9 schematically shows a structure in which the display panel PNL is located inside the display unit MD when the display device 1, according to the embodiment, is not expanded. FIG. 10 shows a structure in which the second panel housing MD2 of the display unit MD is coupled with the first panel housing MD1 when the display device 1, according to the embodiment, is not expanded.

Referring to FIGS. 8 to 10, the housing case SD of the display device 1, according to the embodiment, includes the display unit MD, the hinge HG and the input unit IOD, and slides SM, drive motors PM1 and PM2, and rollers R1 and R2 may be located inside the display unit MD.

As described above, the display unit MD may include the first panel housing MD1, the second panel housing MD2, the third panel housing MD3, the first protrusion PT1, and the second protrusion PT2.

The first panel housing MD1 may include a top cover MD1a disposed on one side in the third direction DR3 to cover one side of the display unit MD in the third direction DR3, a bottom cover MD1b disposed on the opposite side in the third direction DR3 to cover the opposite side of the display unit MD in the third direction DR3, and a rear cover MD1c covering the opposite side of the display unit MD in the first direction DR1.

The top cover MD1a, the bottom cover MD1b and the rear cover MD1c of the first panel accommodation part MD1 may form a space in which the display panel PNL is accommodated. Accordingly, the first panel housing MD1 may accommodate the first active area AA1 of the display panel PNL as shown in FIG. 9. In addition, the housing formed in the first panel housing MD1 may provide a space in which the second panel housing MD2 and the third panel housing MD3 are accommodated. Accordingly, the second panel housing MD2 and the third panel housing MD3 may slide from the first panel housing MD1 in the second direction DR2.

The top cover MD1a of the first panel housing MD1 has a shape that is bent at least once, and thus may form a housing that accommodates the top cover MD2b of the second panel housing MD2 and the top cover MD3b of the third panel housing MD3, which will be described later.

Likewise, the bottom cover MD1b of the first panel housing MD1 has a shape that is bent at least once, and thus may form a housing that accommodates the bottom cover MD2c of the second panel housing MD2 and the bottom cover MD3c of the third panel housing MD3, which will be described later.

The rear cover MD1c of the first panel housing MD1 may connect the top cover MD1a with the bottom cover MD1b. For example, the rear cover MD1c may connect the opposite side of the top cover MD1a in the first direction DR1 with the opposite side of the bottom cover MD1b in the first direction DR1 so that the bottom surface of the display panel PNL is not exposed.

One side of the top cover MD1a in the first direction DR1 and one side of the bottom cover MD1b in the first direction DR1 are spaced apart from each other, to form the display area DA (see FIGS. 2 to 4) where the upper surface of the display panel PNL located inside the first panel housing MD1 is exposed. For example, the top cover MD1a may cover the bezel area on one side of the first active area AA1 of the display panel PNL in the third direction DR3 to expose the first active area AA1, and the bottom cover MD1b may cover the subsidiary area SBA of the display panel PNL and the bezel area on the opposite side of the first active area AA1 of the display panel PNL in the third direction DR3 to expose the first active area AA1, so that the display area DA may be formed.

The first protrusion PT1 and the second protrusion PT2 may be disposed on the opposite side of the first panel housing MD1 in the third direction DR3. The first protrusion PT1 and the second protrusion PT2 are parts of the first panel housing MD1 and may be formed integrally with the first panel housing MD1.

The second panel housing MD2 may be disposed on one side of the first panel housing MD1 in the second direction DR2. When the display device 1 slides and is expanded, the second panel housing MD2 slides in the second direction DR2 from the first panel housing MD1. When the display device 1 is not expanded, it may be located inside the first panel housing MD1.

The second panel housing MD2 may include a bent cover MD1a disposed on one side in the second direction DR2 to cover one side of the display unit MD in the second direction DR2, a top cover MD2b disposed on one side in the third direction DR3 to be coupled with the top cover MD1a of the first panel housing MD1, a bottom cover MD2c disposed on the opposite side in the third direction DR3 to be coupled with the bottom cover MD1b of the first panel housing MD1, and a rear cover MD2c connecting the top cover MD2b with the bottom cover MD2c.

The bent cover MD2a, the top cover MD2b, the bottom cover MD2c and the rear cover MD2d of the second panel housing MD2 may form a space in which the display panel PNL is accommodated. Accordingly, the second panel housing MD2 may accommodate at least a part of the second active area AA2 of the display panel PNL as shown in FIG. 9.

The bent cover MD2*a* of the second panel housing MD2 may have a curved shape with a predetermined radius of curvature. The bent cover MD2*a* may form the first bent area of the display unit MD. For example, a housing may be formed in the bent cover MD2*a* so that at least a part of the second active area AA2 of the display panel PNL may be bent and located therein.

The top cover MD2*b* of the second panel housing MD2 has a shape that is curved at least once, so that it may be coupled with the top cover MD1*a* of the first panel housing MD1. In addition, the top cover MD2*b* may accommodate at least a part of one side of the display panel PNL in the third direction DR3. For example, at least a part of one side of the second active area AA2 in the third direction DR3 may be covered by the top cover MD2*b* of the second panel housing MD2 as shown in FIG. 9.

Similarly, the bottom cover MD2*c* of the second panel housing MD2 has a shape bent at least once, so that it may be coupled to the bottom cover MD1*b* of the first panel housing MD1. In addition, the bottom cover MD2*c* may accommodate at least a part of the opposite side of the display panel PNL in the third direction DR3. For example, at least a part of the opposite side of the second active area AA2 in the third direction DR3 may be covered by the bottom cover MD2*c* of the second panel housing MD3 as shown in FIG. 9.

The rear cover MD2*d* of the second panel housing MD3 may connect the top cover MD2*b* with the bottom cover MD2*c*. For example, the rear cover MD2*d* may connect the opposite side of the top cover MD2*b* in the first direction DR1 with the opposite side of the bottom cover MD2*c* in the first direction DR1 so that the bottom surface of the display panel PNL is not exposed.

One side of the top cover MD2*b* in the first direction DR1 and one side of the bottom cover MD2*c* in the first direction DR1 are spaced apart from each other, to form the display area DA (see FIGS. 2 to 4) where the upper surface of the display panel PNL located inside the second panel housing MD2 is exposed. For example, the top cover MD2*b* may cover the bezel area on one side of the second active area AA2 of the display panel PNL in the third direction DR3 to expose the second active area AA2, and the bottom cover MD2*c* may cover the bezel area on the opposite side of the second active area AA2 of the display panel PNL in the third direction DR3 to expose the second active area AA2, so that the second display area DA2 may be formed.

In addition, as shown in FIG. 10, the bent cover MD2*a* may cover a part of the second active area AA2 bent by the first roller R1 and may further protrude from the top cover MD2*b* and the bottom cover MD2*c* in the first direction DR1 to meet the rear cover MD1*c* of the first panel housing MD1 when the display device 1 is not expanded. Accordingly, the second active area AA2 of the display panel PNL may be fixed so that it does not further slide toward the opposite side in the second direction DR2.

The third panel housing MD3 may be disposed on the opposite side of the first panel housing MD1 in the second direction DR2. When the display device 1 slides and is expanded, the third panel housing MD3 slides in the second direction DR2 from the first panel housing MD1. When the display device 1 is not expanded, it may be located inside the first panel housing MD1.

The third panel housing MD3 may include a bent cover MD3*a* disposed on the opposite side in the second direction DR2 to cover the opposite side of the display unit MD in the second direction DR2, a top cover MD3*b* disposed on one side in the third direction DR3 to be coupled with the top cover MD1*a* of the first panel housing MD1, a bottom cover MD3*c* disposed on the opposite side in the third direction DR3 to be coupled with the bottom cover MD1*b* of the first panel housing MD1, and a rear cover MD3*d* connecting the top cover MD3*b* with the bottom cover MD3*c*.

The bent cover MD3*a*, the top cover MD3*b*, the bottom cover MD3*c* and the rear cover MD3*d* of the third panel housing MD3 may form a space in which the display panel PNL is accommodated. Accordingly, the third panel housing MD3 may accommodate at least a part of the third active area AA3 of the display panel PNL as shown in FIG. 9.

The bent cover MD3*a* of the third panel housing MD3 may have a curved shape with a predetermined radius of curvature. The bent cover MD3*a* may form the second bent area of the display unit MD. For example, a housing may be formed in the bent cover MD3*a* so that at least a part of the third active area AA3 of the display panel PNL may be bent and located therein.

The top cover MD3*b* of the third panel housing MD3 has a shape that is curved at least once, so that it may be coupled with the top cover MD1*a* of the first panel housing MD1. In addition, the top cover MD3*b* may accommodate at least a part of one side of the display panel PNL in the third direction DR3. For example, at least a part of one side of the third active area AA3 in the third direction DR3 may be covered by the top cover MD3*b* of the third panel housing MD3 as shown in FIG. 9.

Similarly, the bottom cover MD3*c* of the third panel housing MD3 has a shape bent at least once, so that it may be coupled to the bottom cover MD1*b* of the first panel housing MD1. In addition, the bottom cover MD3*c* may accommodate at least a part of the opposite side of the display panel PNL in the third direction DR3. For example, at least a part of the opposite side of the third active area AA3 in the third direction DR3 may be covered by the bottom cover MD3*c* of the third panel housing MD3 as shown in FIG. 9.

The rear cover MD3*d* of the third panel housing MD3 may connect the top cover MD3*b* with the bottom cover MD3*c*. For example, the rear cover MD3*d* may connect the opposite side of the top cover MD3*b* in the first direction DR1 with the opposite side of the bottom cover MD3*c* in the first direction DR1 so that the bottom surface of the display panel PNL is not exposed.

One side of the top cover MD3*b* in the first direction DR1 and one side of the bottom cover MD3*c* in the first direction DR1 are spaced apart from each other, to form the display area DA (see FIGS. 2 to 4) where the upper surface of the display panel PNL located inside the third panel housing MD3 is exposed. For example, the top cover MD3*b* may cover the bezel area on one side of the third active area AA3 of the display panel PNL in the third direction DR3 to expose the third active area AA3, and the bottom cover MD3*c* may cover the bezel area on the opposite side of the third active area AA3 of the display panel PNL in the third direction DR3 to expose the third active area AA3, so that the third display area DA3 may be formed.

Similarly to the bent cover MD2*a* of the second panel housing MD2, the bent cover MD3*a* of the third panel housing MD3 may cover a part of the third active area AA3 bent by the second roller R2 and may further protrude from the top cover MD3*b* and the bottom cover MD3*c* in the first direction DR1 to meet the rear cover MD1*c* of the first panel housing MD1 when the display device 1 is not expanded. Accordingly, the third active area AA3 of the display panel PNL may be fixed so that it does not further slide in the second direction DR2.

A plurality of slides SM may be disposed between the first panel housing MD1 and the second panel housing MD2 and between the first panel housing MD1 and the third panel housing MD3. The slides SM may allow the display unit MD to slide. The structure of the slides SM will be described in detail later.

The slides SM may have a shape generally extended in the second direction DR2. The slides SM may include a first slide SM1 and a second slide SM2 connecting the second panel housing MD2 with the first panel housing MD1, and a third slide SM3 and a fourth slide SM4 connecting the third panel housing MD3 with the first panel housing MD1.

The first slide SM1 and the second slide SM2 may be disposed between the first panel housing MD1 and the second panel housing MD2. The second slide SM2 may be disposed adjacent to the bottom cover MD1$b$ of the first panel housing MD1 and the bottom cover MD2$c$ of the second panel housing MD2, and the first slide SM1 may be disposed adjacent to the top cover MD1$a$ of the first panel housing MD1 and the top cover MD2$b$ of the second panel housing MD2.

The first slide SM1 and the second slide SM2 may be spaced apart from each other in the third direction DR3. The first roller R1 may be disposed in the space between the first slide SM1 and the second slide SM2. For example, the first roller R1 may be disposed in the space between the first slide SM1 and the second slide SM2 to connect one side of the first slide SM1 with one side of the second slide SM2 in the second direction DR2. Accordingly, the first slide SM1, the second slide SM2 and the first roller R1 may both move together. When the first slide SM1, the second slide SM2 and the first roller R1 may move in the second direction DR2, the second panel housing MD2 and the second active area AA2 of the display panel PNL may slide in the second direction DR2.

The third slide SM3 and the fourth slide SM4 may be disposed between the first panel housing MD1 and the third panel housing MD3. The fourth slide SM4 may be disposed adjacent to the bottom cover MD1$b$ of the first panel housing MD1 and the bottom cover MD3$c$ of the third panel housing MD3, and the third slide SM3 may be disposed adjacent to the top cover MD1$a$ of the first panel housing MD1 and the top cover MD3$b$ of the third panel housing MD3.

The third slide SM3 and the fourth slide SM4 may be spaced apart from each other in the third direction DR3. The second roller R2 may be disposed in the space between the third slide SM3 and the fourth slide SM4. For example, the second roller R1 may be disposed in the space between the third slide SM3 and the fourth slide SM4 to connect the opposite side of the third slide SM3 with the opposite side of the fourth slide SM4 in the second direction DR2. Accordingly, the third slide SM3, the fourth slide SM4 and the second roller R2 may all move together. When the third slide SM3, the fourth slide SM4 and the second roller R2 move in the second direction DR2, the third panel housing MD3 and the third active area AA3 of the display panel PNL may slide in the second direction DR2.

The first protrusion PT1 may be disposed on the opposite side of the first panel housing MD1 in the third direction DR3 and disposed closer to one side in the second direction DR2, and may be coupled with one side of the hinge HG in the second direction DR2 to rotate on the folding axis FX (see FIGS. 1 to 4). A housing may be formed in the first protrusion PT1 so that a first drive motor PM1 that provides power for the sliding motion of the second panel housing MD2 and the second active area AA2 of the display panel PNL may be located therein.

The first drive motor PM1 may be connected to the second slide SM2 to transmit power to the second slide SM2. This will be described in more detail later.

The second protrusion PT2 may be disposed on the opposite side of the first panel housing MD1 in the third direction DR3 and disposed closer to the opposite side in the second direction DR2, and may be coupled with the opposite side of the hinge HG in the second direction DR2 to rotate on the folding axis FX (see FIGS. 1 to 4). A housing may be formed in the second protrusion PT2 so that a second drive motor PM2 that provides power for the sliding motion of the third panel housing MD3 and the third active area AA3 of the display panel PNL may be located therein.

The second drive motor PM2 may be connected to the fourth slide SM4 to transmit power to the fourth slide SM4. This will be described in more detail later.

Hereinafter, a structure in which the display panel PNL is coupled with the slide SM will be described.

Figure 11:
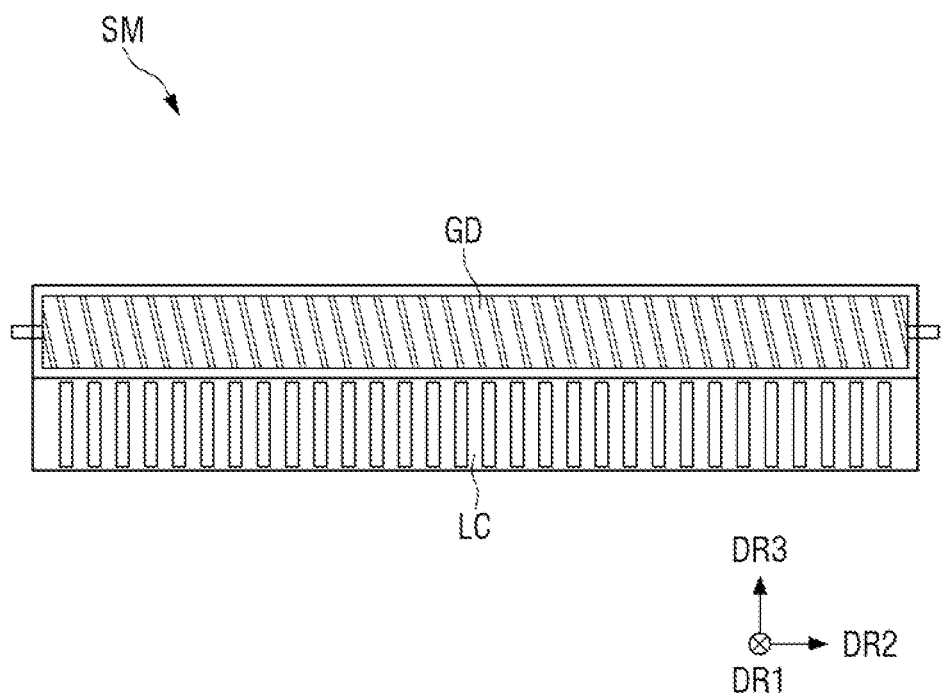
FIG. 11 is a rear view showing a slide according to an embodiment of the disclosure.
Figure 12:
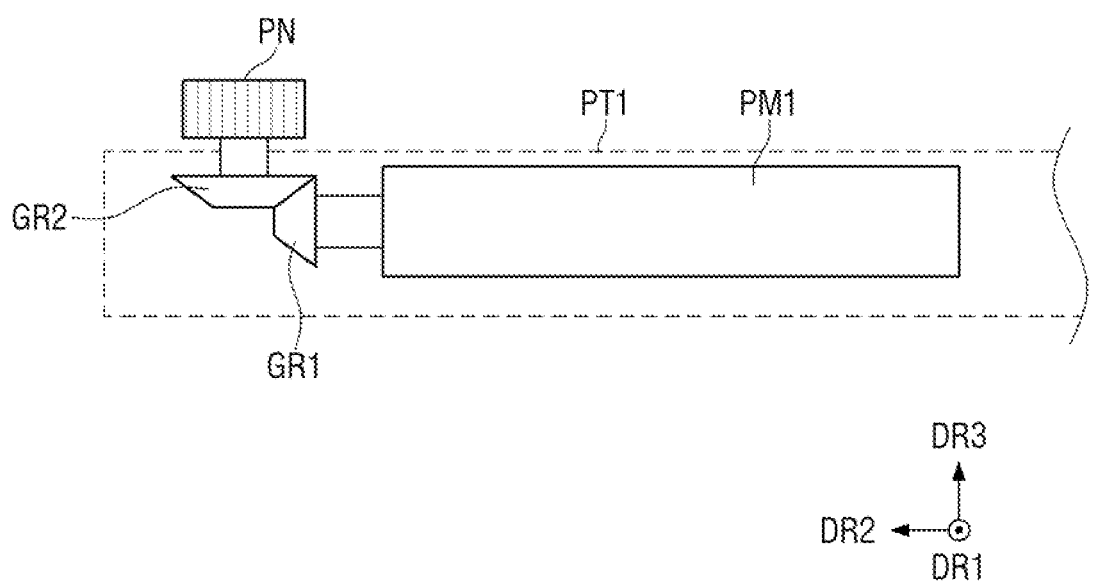
FIG. 12 is a plan view showing a first driving motor and gears connected thereto according to an embodiment of the disclosure.
Figure 13:
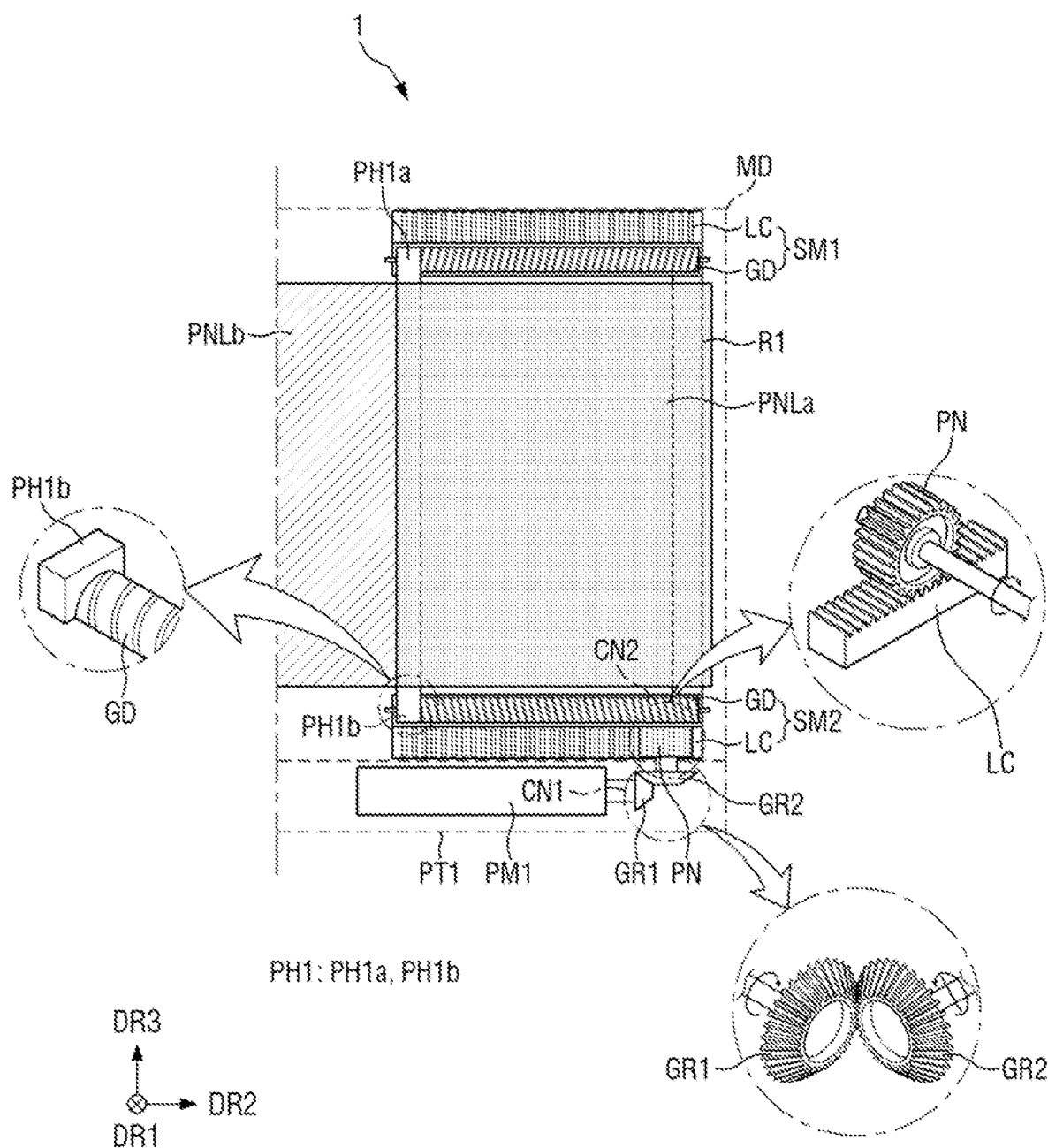
FIG. 13 is a plan view showing a coupling structure between a display panel and a slide according to an embodiment of the disclosure.

FIG. 11 is a rear view showing a slide according to an embodiment. FIG. 12 is a plan view showing a first drive motor and gears connected thereto according to an embodiment. FIG. 13 is a plan view showing a coupling structure between a display panel and a slide according to an embodiment.

The coupling relationship between the second active area AA2 of the display panel PNL, the first slide SM1, the second slide SM2 and the first roller R1 is substantially identical to the coupling relationship between the third active area AA3 of the display panel PNL, the third slide SM3, the fourth slide SM4 and the second roller R2; and, therefore, to the extent that a description of an element has been omitted, it may be assumed that the element is at least similar to corresponding elements that are described elsewhere within the present disclosure.

In addition, the connection relationship between the first drive motor PM1 and the second slide SM2 is substantially identical to the connection relationship between the second drive motor PM2 and the fourth slide SM4; and, therefore, to the extent that a description of an element has been omitted, it may be assumed that the element is at least similar to corresponding elements that are described elsewhere within the present disclosure.

Referring to FIGS. 11 and 13 in conjunction with FIG. 8, a slide SM, according to an embodiment, may include a rack gear LC extended in the second direction DR2, and a guide GD adjacent to the rack gear LC in the third direction DR3 and extended in the second direction DR2. For example, each of the first slide SM1, the second slide SM2, the third slide SM3 and the fourth slide SM4 may include the rack gear LC and the guide GD.

In some embodiments, the rack gear LC and the guide GD may be formed on the opposite surface of the slide SM in the first direction DR1, and one surface of the slide SM in the first direction DR1 may be a flat plate. It should be understood, however, that the disclosure is not necessarily limited thereto. In the example shown in FIGS. 8 and 11 to 13, the rack gear LC and the guide GD are formed on the opposite surface of the slide SM in the first direction DR1.

The rack gear LC may include teeth spaced apart from one another in the second direction DR2. The teeth may have convex and concave surfaces in the first direction DR1 and may be connected to a pinion gear PN, which will be described later.

In some embodiments, the guide GD may have, but is not necessarily limited to having, a screw shape. For example, the guide GD may have a rail shape. In the example shown in FIGS. 11 to 13, the guide GD has a screw shape. The first panel connector PH1 or the second panel connector PH2 may be connected to the guide GD.

Referring to FIGS. 12 and 13 in conjunction with FIG. 8, a first gear GR1 having a bevel gear shape narrowing toward one side in the second direction DR2 may be disposed on one side of the first drive motor PM1 in the second direction DR2, a second gear GR2 having a bevel gear shape narrowing toward the opposite side in the third direction DR3 may be disposed on one side of the first gear GR1 in the third direction DR3, and a pinion gear PN connected to the above-described rack gear LC may be disposed on one side of the second gear GR2 in the third direction DR3.

The first gear GR1 connected to one side of the first drive motor PM1 in the second direction DR2 may have a rotation axis in the second direction DR2 and may rotate on the rotation axis. For example, due to the rotational movement of the first drive motor PM1, the first gear GR1 may rotate on the rotational axis in the second direction DR2.

The second gear GR2 may be connected to one side of the first gear GR1 in the third direction DR3 in a first connection type CN1. The first gear GR1 and the second gear GR2 are bevel gears, and may be connected to each other with different rotation axes. For example, when the first gear GR1 rotates on the rotation axis in the second direction DR2, the second gear GR2 may rotate on the rotation axis in the third direction DR3 due to the connection relationship with the first gear GR1. For example, the rotation axis of the rotational motion transmitted from the first drive motor PM1 may be changed by the first connection type CN1.

A pinion gear PN may be disposed on one side of the second gear GR2 in the third direction DR3. The second gear GR2 and the pinion gear PN may be formed integrally so that they can move together. For example, when the second gear GR2 rotates on the rotation axis in the third direction DR3, the pinion gear PN may also rotate on the rotation axis in the third direction DR3.

The pinion gear PN may be connected to the rack gear LC of the second slide SM2 in a second connection type CN2. When the pinion gear PN rotates on the rotation axis in the third direction DR3, the rack gear LC may move in the second direction DR2. For example, the rotational motion may be converted into a linear motion by the second connection type CN2.

Referring to FIG. 13, the first slide SM1 and the second slide SM2 are spaced apart from each other in the third direction DR3 by the width of the display panel PNL in the third direction DR3, and the display panel PNL may surround the first roller R1.

The arrangement relationship between the rack gear LC and the guide GD of the first slide SM1 may be opposite to the arrangement relationship between the rack gear LC and the guide GD of the first slide SM2. For example, the rack gear LC of the second slide SM2 may be disposed adjacent to the first drive motor PM1, and the guide GD of the second slide SM2 may be disposed adjacent to the opposite side of the display panel PNL in the third direction DR3. On the other hand, the guide GD of the first slide SM1 may be disposed adjacent to one side of the display panel PNL in the third direction DR3, and the rack gear LC of the first slide SM1 may be disposed adjacent to one side of the display unit MD in the third direction DR3.

The display panel PNL may include an upper surface on which the above-described pixels are disposed and a lower surface on which the above-described segments SG and the like are attached. Since the display panel PNL is bent to surround the first roller R1, when the display unit MD is viewed from the opposite side in the first direction DR1, i.e., from the rear side, the upper surface of the display panel PNL may be disposed on the lower surface of the display panel PNL.

A part of the display panel PNL that is extended toward one side in the second direction DR2 and extended to the first roller R1 will be described referred to as a "first portion PNLb." A part of the display panel PNL that surrounds the first roller R1 and is extended again toward the opposite side in the second direction DR2 will be described referred to as a "second portion PNLa." At least a part of the first portion PNLb may overlap with the second portion PNLa in the first direction DR1. In this instance, the bottom surface of the first portion PNLb may face the bottom surface of the second portion PNLa in the first direction DR1.

The above-described first panel connector PH1 may be attached to the end of the second portion PNLa, i.e., on the bottom surface of the opposite end of the second portion PNLa in the second direction DR2 with reference to FIG. 13. Since the width of the first panel connector PH1 in the third direction DR3 is greater than the width of the display panel PNL in the third direction DR3, at least a part of the first panel connector PH1 may protrude from the display panel PNL in the third direction DR3. In the example shown in FIG. 13, the first panel connector PH1 is disposed on the bottom surface of the second portion PNLa of the display panel PNL and protrudes from the both sides of the second portion PNLa in the third direction DR3.

The first panel connector PH1 may include a first protruding portion PH1a protruding from the second portion PNLa of the display panel PNL toward one side in the third direction DR3 and a second protrusion portion PH1b protruding toward the opposite side in the third direction DR3.

The second protruding portion PH1b of the first panel connector PH1 may be connected to the guide GD of the second slide SM2 in a third connection type CN3. For example, when the guide GD has a screw shape, the second protruding portion PH1b of the first panel connector PH1 and the guide GD may be connected by means of a bolt and a nut. In this instance, when the guide GD rotates on the rotation axis in the second direction DR2, the second protruding portion PH1b of the first panel connector PH1 may move in the second direction DR2. For example, the third connection type CN3 may convert the rotational motion into a linear motion in the same direction as the rotational axis of the rotational motion.

Similarly, the first protruding portion PH1a of the first panel connector PH1 may be connected to the guide GD of the first slide SM1 in the third connection type CN3.

Hereinafter, a sliding mechanism of the display unit MD and the display panel PNL of the display device 1 according to an embodiment slide will be described.

Figure 14:
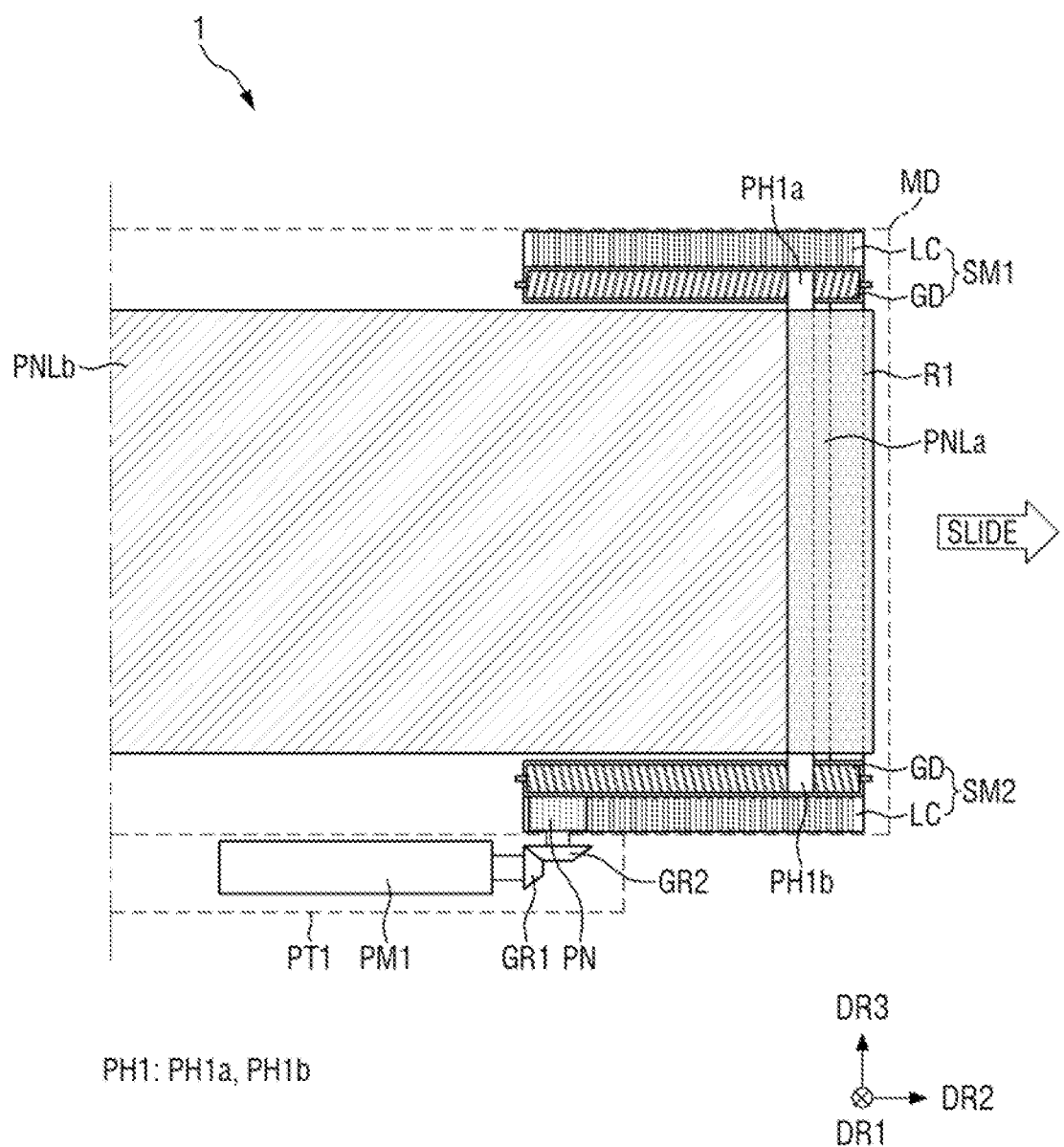
FIG. 14 is a plan view showing a coupling structure between a display panel and a slide when a display device is in an expanded state according to an embodiment of the disclosure.
Figure 15:
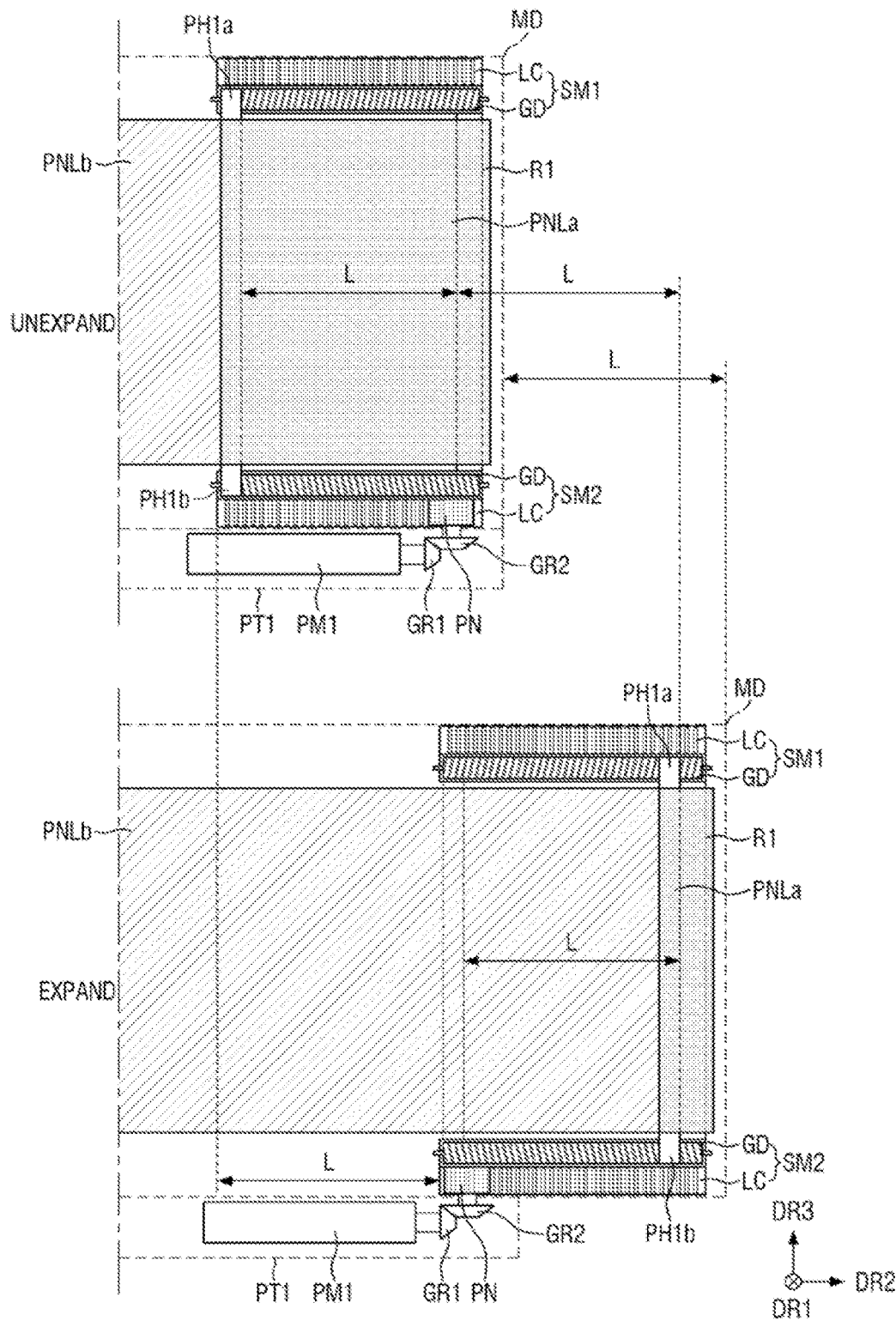
FIG. 15 is a view illustrating a sliding motion of a sliding module of a display device according to an embodiment of the disclosure.

FIG. 14 is a plan view showing a coupling structure between a display panel and a slide when a display device, according to other embodiment, is expanded. FIG. 15 is a view for illustrating a sliding motion of a sliding module of a display device according to an embodiment of the disclosure.

Referring to FIG. 14, when the first drive motor PM1 rotates the first gear GR1 clockwise when viewed from one side in the second direction DR2 with respect to the rotation axis in the second direction DR2, the second gear GR2 may be engaged with the first gear GR1 to rotate clockwise when viewed from one side in the third direction DR3 with respect to the rotation axis in the third direction DR3, and the rack gear LC of the second slide SM2 may be engaged with the second gear GR2 to linearly move toward one side in the second direction DR2.

As the rack gear LC of the second slide SM2 linearly moves toward the one side in the second direction DR2, the display unit MD and the display panel PNL may slide toward the one side in the second direction DR2.

On the other hand, when the first drive motor PM1 rotates the first gear GR1 counterclockwise when viewed from the one side in the second direction DR2 with respect to the rotation axis in the second direction DR2, the second gear GR2 may be engaged with the first gear GR1 to rotate counterclockwise when viewed from the one side in the third direction DR3 with respect to the rotation axis in the third direction DR3, and the rack gear LC of the second slide SM2 may be engaged with the second gear GR2 to linearly move toward the opposite side in the second direction DR2.

As the rack gear LC of the second slide SM2 linearly moves toward the opposite side in the second direction DR2, the display unit MD and the display panel PNL may slide toward the opposite side in the second direction DR2.

Referring to FIG. 15, when the display device 1 is not extended, the rack gear LC of the second slide SM2 slides toward the one side the second direction DR2 by a first unit L by the rotational motion of the first drive motor PM1 so that the display device 1 is expanded, the display unit MD slides toward the one side in the second direction DR2 by the first unit L, and the first panel connector PH1 attached to the end of the display panel PNL may move by twice the first unit L.

For example, when the rack gear LC of the second slide SM2 moves toward the one side in the second direction DR2 by the first unit L by the rotational motion of the first drive motor PM1, the first panel connector PH1 attached to the end of the display panel PNL may be further move on the guide GD of the second slide SM2 toward the one side in the second direction DR2 by the first unit L, so that it may finally move by twice the first unit L. Accordingly, even when the display panel PNL slides, the surface quality of the display panel PNL can be maintained.

With the above-described configuration, the display device 1 according to the embodiment is capable of the folding operation as well as the sliding operation, and it does not require a separate housing that changes the exterior of the display device 1 because the drive motors PM1 and PM2 that provide power for the slide operation of the display unit MD are located inside the protrusions PT1 and PT2 connected to the hinge HG.

Hereinafter, a display device 1 according to an embodiment of the disclosure will be described. In the following description, the same or similar elements will be denoted by the same or similar reference numerals, and to the extent that a description of an element has been omitted or only briefly described, it may be assumed that the element is at least similar to corresponding elements that are described elsewhere within the present disclosure.

Figure 16:
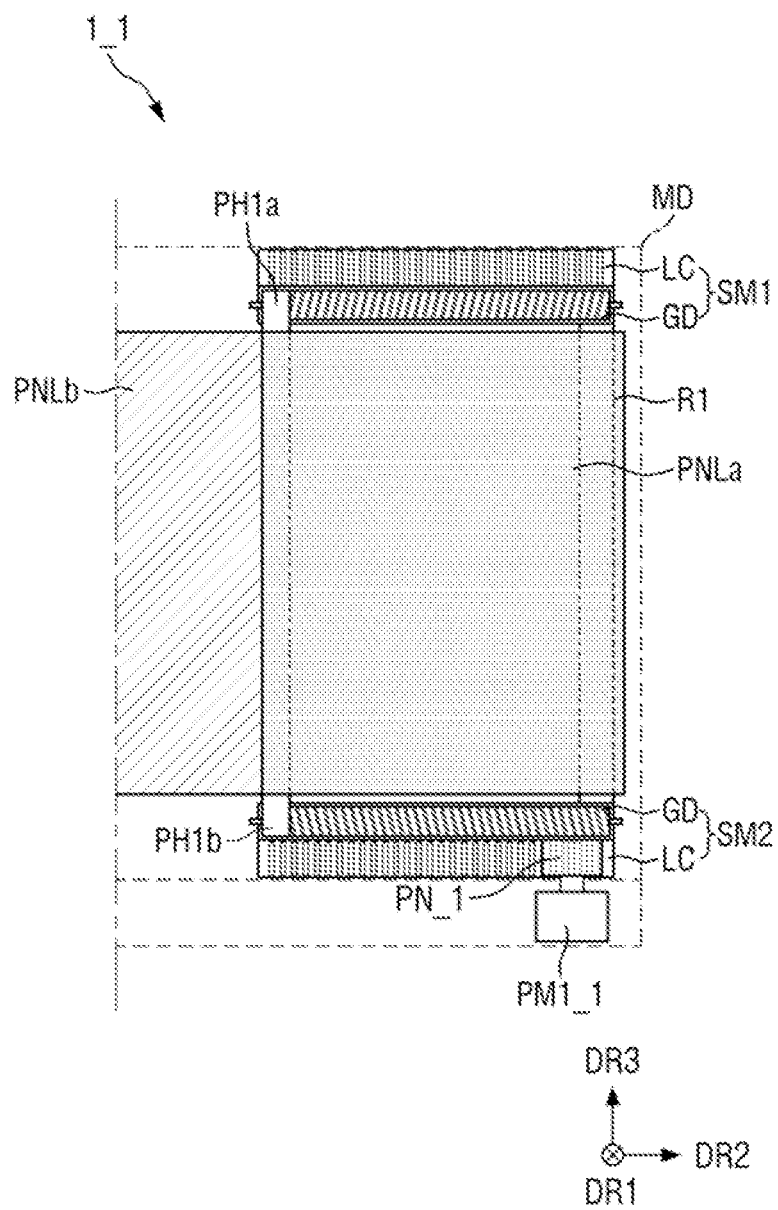
FIG. 16 is a plan view showing a coupling structure between a display panel of a display device and a slide according to other embodiment of the disclosure.

FIG. 16 is a plan view showing a coupling structure between a display panel of a display device and a slide according to an embodiment.

In a display device 1_1 according to the embodiment of FIG. 16, a first drive motor PM1_1 may be connected directly to a pinion gear PN_1.

For example, the first drive motor PM1_1 according to this embodiment rotates with a rotation shaft in the third direction DR3, and the pinion gear PN_1 may be attached to one side of the first drive motor PM1_1 in the third direction DR3, so that the pinion gear PN_1 may also rotate on the rotation axis in the third direction DR3.

With the above-described configuration, the power of the first drive motor PM1_1 is transmitted directly to the rack gear LC of the second slide SM2 in the display device 1_1 according to this embodiment, thereby reducing power loss.

Figure 17:
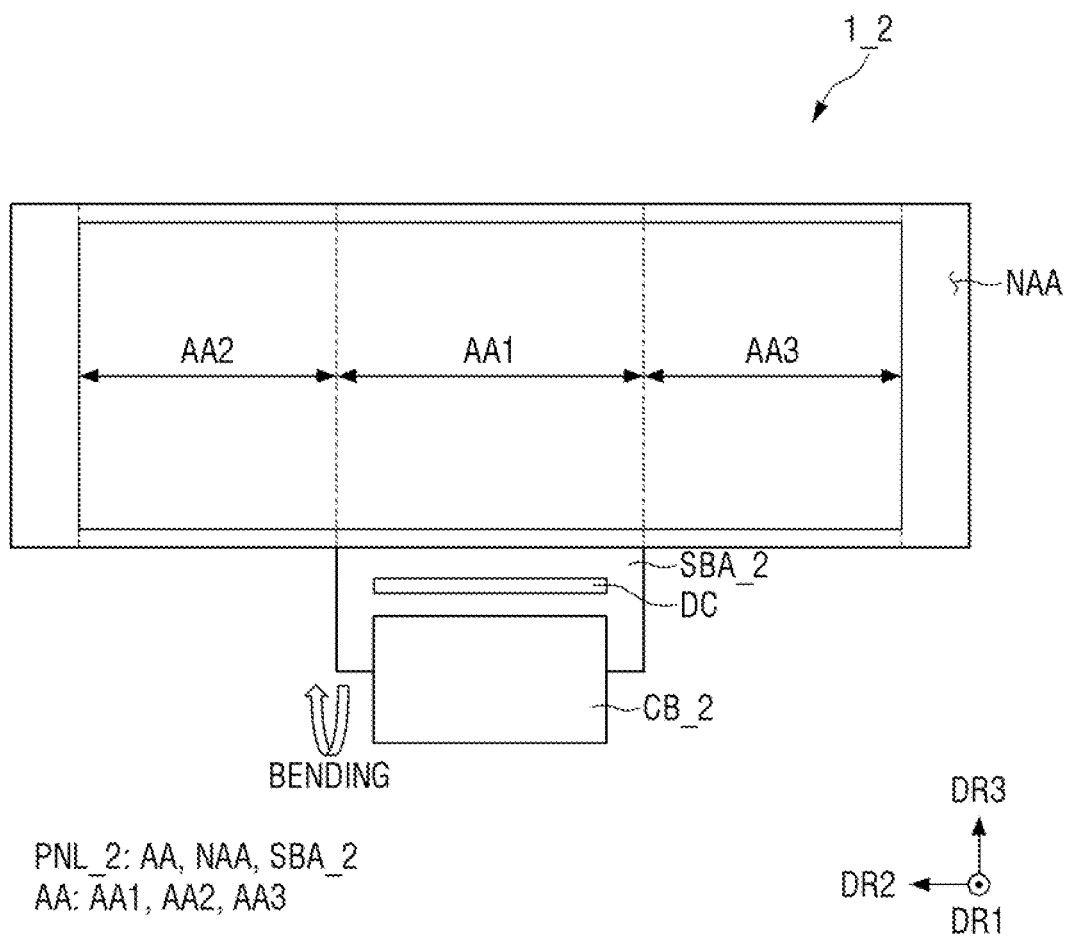
FIG. 17 is a plan view showing a display panel of a display device according to an embodiment of the disclosure.
Figure 18:
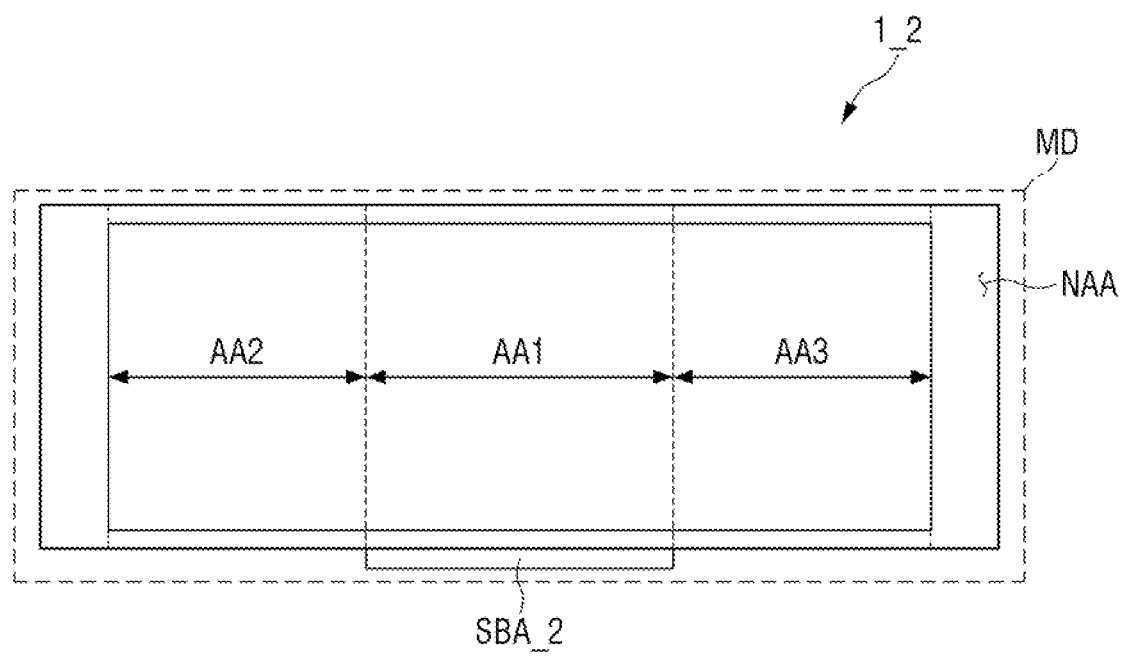
FIG. 18 is a plan view showing the subsidiary area of the display panel of FIG. 17 in a bent state according to an embodiment of the disclosure.

FIG. 17 is a plan view showing a display panel of a display device according to an embodiment of the disclosure. FIG. 18 is a plan view showing the subsidiary area of the display panel according to the embodiment of FIG. 17 when it is bent.

According to the embodiment of FIGS. 17 and 18, a subsidiary area SBA_2 of a display panel PNL_2 of a display device 12 may have a width equal to the width of the first active area AA1 in the second direction DR2. According to this embodiment, the subsidiary area SBA_2 may have a smaller width in the second direction DR2 and a larger width in the third direction DR3 than the subsidiary area SBA of the display panel PNL of the display device 1 according to the above embodiment.

According to this embodiment, a circuit board CB_2 having a rectangular shape including longer sides in the third direction DR3 and shorter sides in the second direction DR2 when viewed from the top may be disposed on the subsidiary area SBA_2. It should be understood, however, that the shape of the circuit board CB_2 when viewed from the top is not necessarily limited thereto.

According to this embodiment, the subsidiary area SBA_2 may be bent or curved. When the subsidiary area SBA_2 is bent, the subsidiary area SBA_2 may be located in the space formed by bending the second active area AA2 and the third active area AA3 of the display panel PNL, such that it may overlap with the first active area AA1 in the third direction DR3 as shown in FIG. 18.

With the above-described configuration, the display unit MD of the display device 1_2 according to this embodiment can reduce the non-display area NDA that covers the non-active area NAA of the display panel PNL_2 (see FIGS. 2 to 4).

Figure 19:
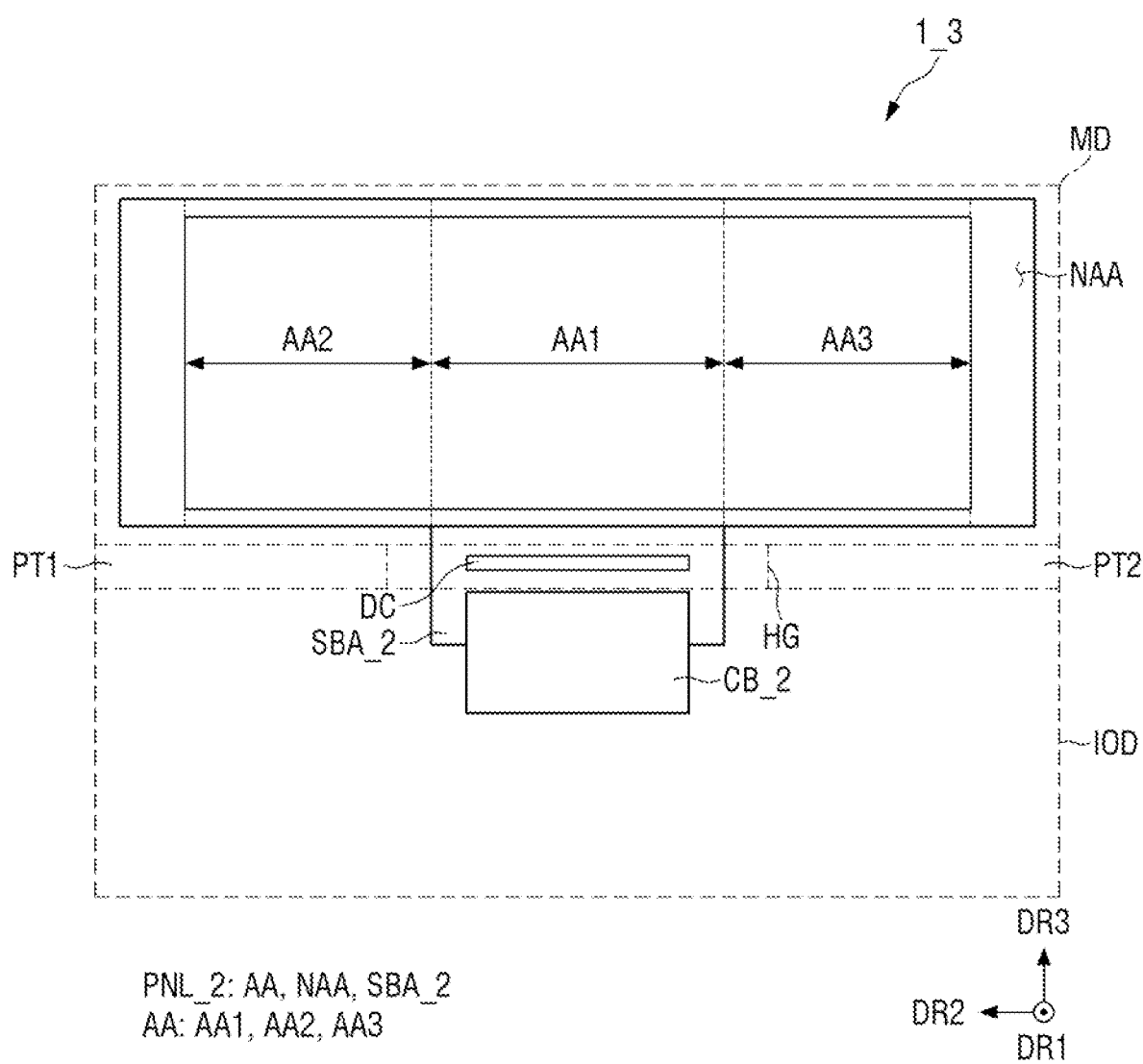
FIG. 19 is a plan view showing a display panel of a display device according to an embodiment of the disclosure.

FIG. 19 is a plan view showing a display panel of a display device according to an embodiment of the disclosure.

A display panel PNL_2 of a display device 1_3, according to the embodiment of FIG. 19, is substantially identical to the display panel PNL_2, according to the embodiment of FIG. 17, except that a subsidiary area SBA_2 of the display panel PNL_2 reaches an input unit IOD through a hinge HG.

With the above-described configuration, the display device 1_3, according to this embodiment, can reduce the non-display area NDA that covers the non-active area NAA of the display panel PNL_2 of the display unit MD (see FIGS. 2 to 4) without increasing the thickness of the display unit MD, i.e., the width in the first direction DR1.

Figure 20:
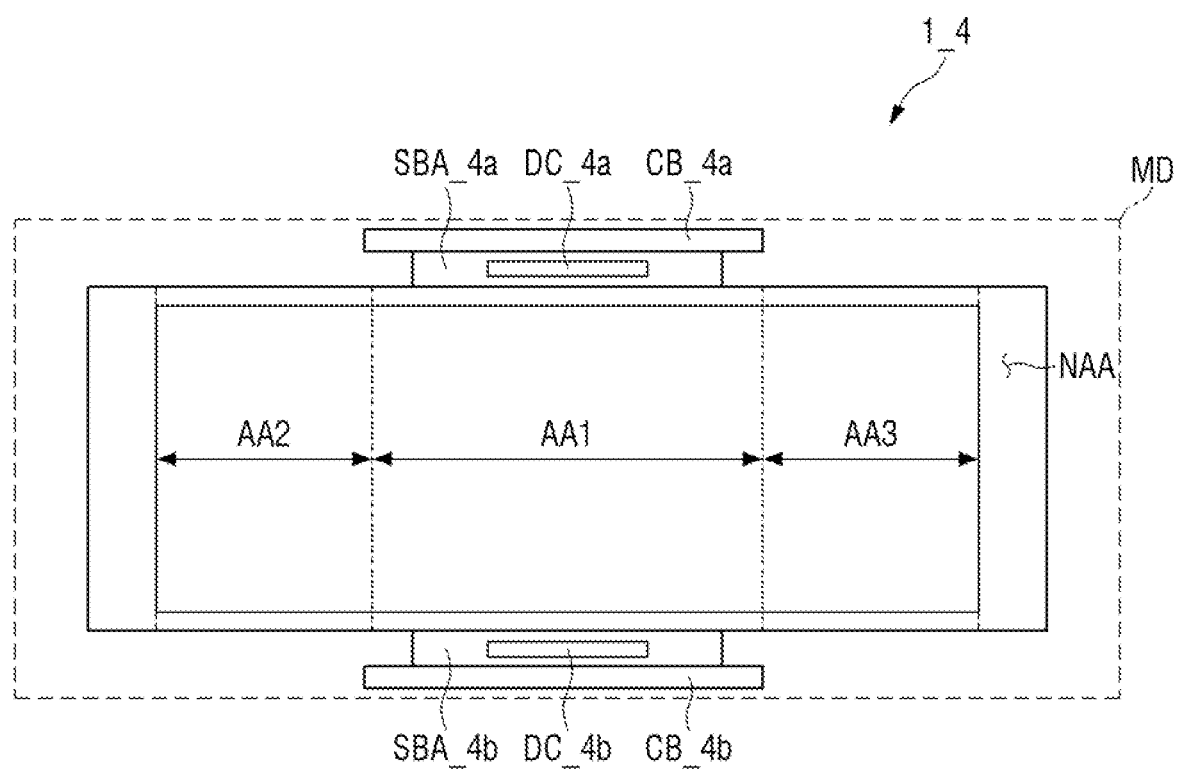
FIG. 20 is a plan view showing a display panel of a display device according to an embodiment of the disclosure.
Figure 20:
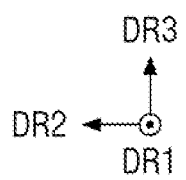

FIG. 20 is a plan view showing a display panel of a display device according to an embodiment of the disclosure.

Referring to FIG. 20, a display panel PNL_4 of a display device 1_4, according to this embodiment, may include a first subsidiary area SBA_4a located on one side of the first active area AA1 in the third direction DR3, and a second subsidiary area SBA_4b located on the opposite side of the first active area AA1 in the third direction DR3. For example, the display panel PNL_4 according to this embodiment may have a cross shape when viewed from the top.

The width of each of the first subsidiary area SBA_4a and the second subsidiary area SBA_4b in the third direction DR3 may be smaller than the width of the subsidiary area SBA of the display device 1 according to the above embodiment.

A first driver circuit DC_4a and a first circuit board CB_4a may be disposed on the first subsidiary area SBA_4a, and a second driver circuit DC_4b and a second circuit board CB_4b may be disposed on the second subsidiary area SBA_4b.

With the above-described configuration, in the display unit MD of the display device 1_4 according to this embodiment, the non-display area NDA on the one side in the third direction DR3 may be equal to the non-display area NDA on the opposite side in the third direction DR3.

Figure 21:
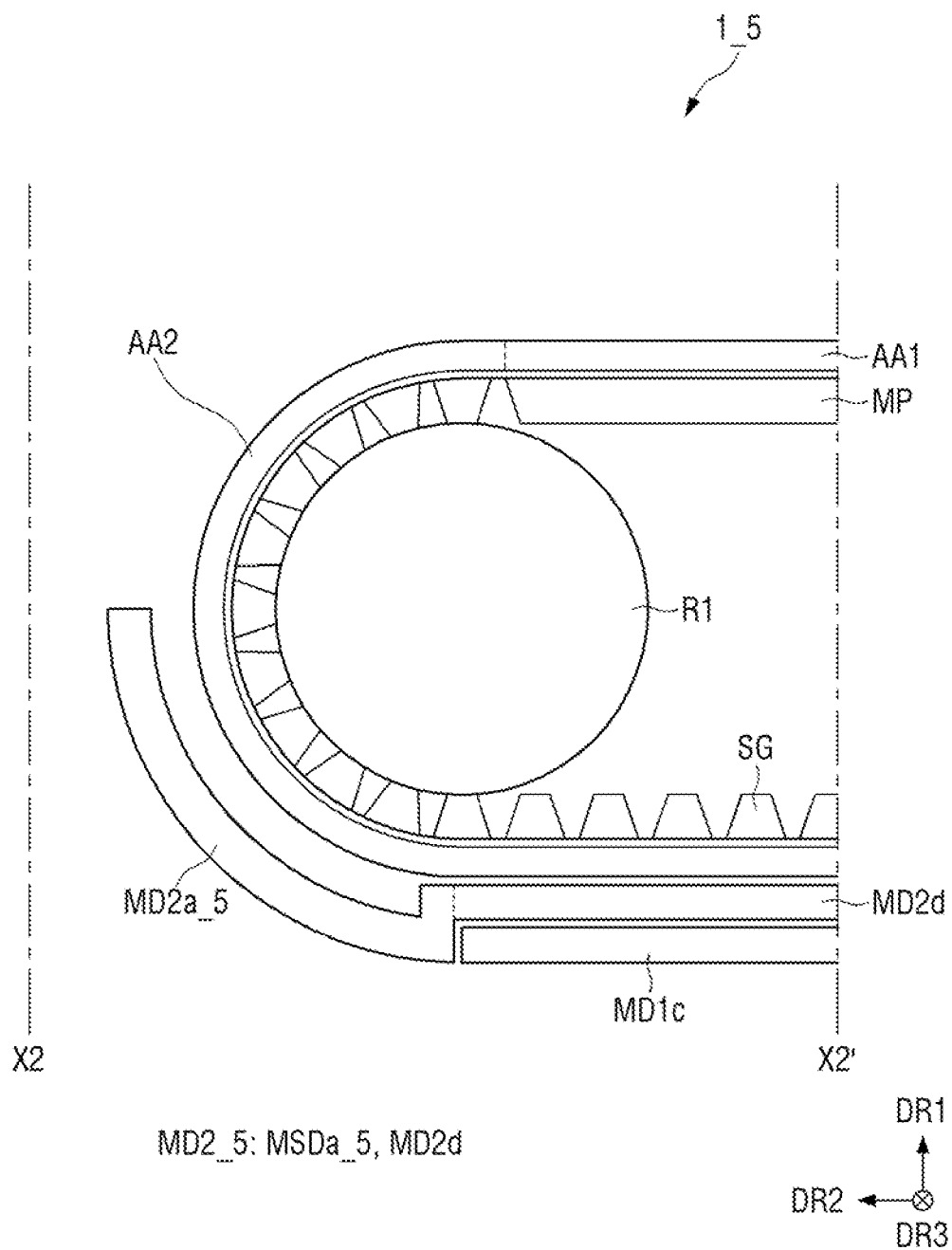
FIG. 21 is a cross-sectional view schematically showing a second accommodation unit of a display device according to an embodiment of the disclosure.

FIG. 21 is a cross-sectional view schematically showing a second accommodation unit of a display device according to an embodiment.

Referring to FIG. 21, a second panel housing MD2_5 of a display device 1_5 according to this embodiment may include a bent cover MD2a_5 partially exposing the curved portion of the second active area AA2.

The second panel housing MD2_5, according to this embodiment, is substantially identical to the second panel housing MD2 of the display device 1 according to the above embodiment except for the shape of the bent cover MD2a_5.

With the above-described configuration, the area of the display area DA (see FIG. 2) can be increased when the display device 1_5 according to this embodiment is not expanded.

In concluding the detailed description, those skilled in the art will appreciate that many variations and modifications can be made to the preferred embodiments without substantially departing from the principles of the present invention.

What is claimed is:

1. A display device, comprising:
 a display panel comprising a first active area and a second active area that is adjacent to the first active area in a first direction, the second active area configured to slide from the first active area in the first direction;
 an input unit disposed adjacent to the display panel;
 a hinge having a folding axis in the first direction and configured to couple the display panel to the input unit so that the display panel and the input unit are configured to be folded on the folding axis; and
 a first motor gear configured to provide power for a sliding operation of the second active area of the display panel,
 wherein the display panel comprises a first slide for sliding the second active area of the display panel in the first direction,
 wherein the first motor gear is disposed on one side of the hinge in the first direction to engage with the first slide,
 wherein both the hinge and the first motor gear are disposed between the display panel and the input unit,
 wherein the first slide comprises:
 a first lower slide; and
 a first upper slide spaced apart from the first lower slide in a second direction intersecting the first direction,
 wherein a roller is disposed between the first lower slide and the first upper slide, and
 wherein the second active area of the display panel is bent to surround at least a part of the roller.

2. The display device of claim 1, wherein the first lower slide comprises a rack gear extended in the first direction, and
 wherein the first motor gear is engaged with the rack gear to move the rack gear in the first direction.

3. The display device of claim 2, further comprising:
 a gearing configured to connect the first motor gear with the rack gear,
 wherein the first motor gear has a bevel gear shape, and
 wherein the gearing comprises a first gear engaged with the first motor gear as a bevel gear and a pinion gear disposed on an opposite side to the first gear and engaged with the rack gear.

4. The display device of claim 2, wherein the second active area of the display panel comprises a first end adjacent to the first active area and a second end disposed opposite to the first end,
 wherein a panel connector is disposed on the second end of the second active area,
 wherein the first lower slide further comprises a guide disposed adjacent to the rack gear, and
 wherein at least a part of the panel connector is engaged with the guide.

5. The display device of claim 4, wherein the first upper slide, the first lower slide and the roller all move together.

6. The display device of claim 5, wherein the rack gear and the guide of the first lower slide both move together.

7. The display device of claim 6, wherein when the first lower slide is moved by a first unit in the first direction by the first motor gear, the panel connector moves further by the first unit on the guide of the first lower slide.

8. The display device of claim 1, wherein the display panel comprises a third active area disposed opposite to the second active area with the first active area disposed therebetween and a first subsidiary area protruding from the first active are in the second direction,
 wherein the display panel further comprises a first protrusion that protrudes from the display panel in a second direction intersecting the first direction and is coupled with an end of the hinge, a second protrusion that protrudes from the display panel in the second direction and coupled with an opposite end of the hinge, and a second slide for sliding the third active area in the first direction,
 wherein the first motor gear is accommodated in the first protrusion of the display panel and is engaged with the first slide, and
 wherein the display device further comprises a second motor gear accommodated in the second protrusion and engaged with the second slide to provide power for a slide operation of the third active area.

9. The display device of claim 8, wherein the hinge is disposed between the first protrusion and the second protrusion.

10. The display device of claim 9, wherein the first protrusion and the second protrusion are configured to rotate about the folding axis.

11. The display device of claim 8, wherein the first subsidiary area is disposed in the display panel such that it is bent.

12. The display device of claim 8, wherein the first subsidiary area is extended to the input unit through the hinge.

13. The display device of claim 8, further comprising a second subsidiary area opposite to the first subsidiary area with the second active area disposed therebetween.

14. A housing case, comprising:
 a display unit in which a display panel is accommodated;
 an input unit disposed on one side of the display unit; and
 a hinge having a folding axis in a first direction and disposed between the display unit and the input unit to couple them with each other,
 wherein the display unit comprises:
 a first panel housing adjacent to the input unit with the hinge disposed therebetween;
 a second panel housing configured to slide in the first direction from the first panel housing;

a slide disposed between the first panel housing and the second panel housing and configured to slide the second panel housing; and a motor gear disposed on one side of the hinge in the first direction and engaged with the slide to provide power for a slide operation of the second panel housing, wherein both the hinge and the motor gear are disposed between the display unit and the input unit, wherein the first slide comprises:

a first lower slide; and a first upper slide spaced apart from the first lower slide in a second direction intersecting the first direction, wherein a roller is disposed between the first lower slide and the first upper slide, and wherein the second active area of the display panel is bent to surround at least a part of the roller.

15. The housing case of claim 14, wherein the display unit further comprises a protrusion that protrudes from the first panel housing in a second direction intersecting the first direction, is coupled with one end of the hinge, and accommodates the motor gear, wherein the slide comprises a lower slide disposed adjacent to the protrusion and an upper slide spaced apart from the lower slide in the second direction, and wherein a roller is disposed between the lower slide and the upper slide, the display panel being bent around the roller.

16. The housing case of claim 15, wherein the lower slide comprises a rack gear extended in the first direction, and wherein the motor gear is engaged with the rack gear to move the rack gear in the first direction.

17. The housing case of claim 16, further comprising:

a gearing configured to connect the motor gear with the rack gear, wherein the motor gear has a bevel gear shape, and wherein the gearing comprises a gear engaged with the motor gear as a bevel gear and a pinion gear disposed on an opposite side to the gear engaged with the motor gear and engaged with the rack gear.

18. The housing case of claim 17, wherein a rotation axis of the motor gear extends the first direction, and wherein a rotation axis of the gear engaged with the motor gear extends in the second direction.

19. The housing case of claim 17, wherein the motor gear has a bevel gear shape that becomes narrower toward one side in the first direction, and wherein the gear engaged with the motor gear of the gearing has a bevel gear shape that becomes narrower toward one side in the second direction.

20. A housing case, comprising:

a display unit that slides in a first direction;

an input unit disposed on one side of the display unit;

a hinge having a folding shaft in the first direction and disposed between the display unit and the input unit to couple them with each other; and a drive motor disposed on one side of the hinge in the first direction to provide power for a sliding operation of the display unit, wherein both the hinge and the drive motor are disposed between the display unit and the input unit, wherein the first slide comprises:

a first lower slide; and a first upper slide spaced apart from the first lower slide in a second direction intersecting the first direction, wherein a roller is disposed between the first lower slide and the first upper slide, and wherein the second active area of the display panel is bent to surround at least a part of the roller.

\* \* \* \* \*